(12) United States Patent
Danko

(10) Patent No.: US 10,927,604 B2
(45) Date of Patent: Feb. 23, 2021

(54) SYSTEMS AND METHODS FOR ENHANCING ENERGY EXTRACTION FROM GEOTHERMAL WELLS

(71) Applicant: Board of Regents of the Nevada System of Higher Education, on behalf of the University of Nevada, Reno, Reno, NV (US)

(72) Inventor: George L. Danko, Reno, NV (US)

(73) Assignee: Board of Regents of the University of the Nevada System of Higher Education, on behalf of the University Nevada, Reno, Reno, NV (US)

( * ) Notice: Subject to any disclaimer, the term of this patent is extended or adjusted under 35 U.S.C. 154(b) by 126 days.

(21) Appl. No.: 16/090,097

(22) PCT Filed: Mar. 31, 2017

(86) PCT No.: PCT/US2017/025473
§ 371 (c)(1),
(2) Date: Sep. 28, 2018

(87) PCT Pub. No.: WO2017/173329
PCT Pub. Date: Oct. 5, 2017

(65) Prior Publication Data
US 2019/0128068 A1  May 2, 2019

Related U.S. Application Data

(60) Provisional application No. 62/316,793, filed on Apr. 1, 2016.

(51) Int. Cl.
*E21B 43/26* (2006.01)
*E21B 7/04* (2006.01)
(Continued)

(52) U.S. Cl.
CPC .............. *E21B 7/04* (2013.01); *E21B 33/12* (2013.01); *E21B 33/138* (2013.01); *E21B 43/26* (2013.01);
(Continued)

(58) Field of Classification Search
CPC .......... E21B 33/12; E21B 33/138; E21B 7/04; E21B 47/002; E21B 47/06; E21B 47/10;
(Continued)

(56) References Cited

U.S. PATENT DOCUMENTS 6,776,235 B1 * 8/2004 England ................ E21B 43/267
166/271
8,430,166 B2  4/2013 Danko
(Continued)

FOREIGN PATENT DOCUMENTS

WO  WO 2010/017557  2/2010

OTHER PUBLICATIONS

International Search Report and Written Opinion issued for International Application No. PCT/US2017/025473 dated Jul. 18, 2017.
(Continued)

*Primary Examiner* — David Carroll
(74) *Attorney, Agent, or Firm* — Klarquist Sparkman, LLP

(57) ABSTRACT

Disclosed herein are embodiments of engineered geothermal systems (EGS). Also disclosed are methods and devices for the construction and use of planar artificial fractures in EGS wells, including wells that contain both an injection and extraction points.

16 Claims, 17 Drawing Sheets

(51) Int. Cl.
| | |
|---|---|
| *F24T 10/20* | (2018.01) |
| *E21B 33/12* | (2006.01) |
| *E21B 33/138* | (2006.01) |
| *E21B 47/022* | (2012.01) |
| *E21B 47/06* | (2012.01) |
| *E21B 47/10* | (2012.01) |
| *E21B 49/00* | (2006.01) |

(52) U.S. Cl.
CPC ............ *E21B 47/022* (2013.01); *E21B 47/06* (2013.01); *E21B 47/10* (2013.01); *E21B 49/00* (2013.01); *F24T 10/20* (2018.05); *Y02E 10/10* (2013.01)

(58) Field of Classification Search
CPC .......... E21B 49/00; E21B 43/26; F24T 10/20; F24T 10/00; F24T 2201/00; F24T 2010/53; F24T 50/00; Y02E 10/10
See application file for complete search history.

(56) References Cited

U.S. PATENT DOCUMENTS

| | | | |
|---|---|---|---|
| 2005/0061508 A1* | 3/2005 | Surjaatmadja | ......... E21B 43/26 |
| | | | 166/306 |
| 2008/0053652 A1 | 3/2008 | Corre et al. | |
| 2010/0272515 A1 | 10/2010 | Curlett | |
| 2010/0288466 A1* | 11/2010 | Danko | .................... F24T 10/20 |
| | | | 165/45 |
| 2012/0305247 A1 | 12/2012 | Chen et al. | |
| 2013/0245947 A1* | 9/2013 | Samsom | ............... E21B 47/102 |
| | | | 702/6 |

OTHER PUBLICATIONS

Cornet, "In-situ stress determination techniques and their robustness," *GRC Sacramento*, Oct. 2016.

Danko et al., "Fracture and flow system modeling method for an EGS reservoir," *Proceedings 41$^{st}$ Workshop on Geothermal Reservoir Engineering*, 10 pages, Feb. 22-24, 2016.

Kumar et al., "Hydraulic stimulation of multiple horizontal wells for EGS reservoir creation," *GRC Transactions*, vol. 40, pp. 373-381, Jun. 2016.

Zhou et al., "Optimization of well configuration for a sedimentary enhanced geothermal reservoir," *GRC Transactions*, vol. 40, pp. 383-394, Jun. 2016.

* cited by examiner

FIG. 30A  FIG. 30B  FIG. 30C

SYSTEMS AND METHODS FOR ENHANCING ENERGY EXTRACTION FROM GEOTHERMAL WELLS

CROSS REFERENCE TO RELATED APPLICATIONS

This application is the U.S. National Stage of International Application No. PCT/US2017/025473, filed Mar. 31, 2017, which was published in English under PCT Article 21(2), which in turn claims the benefit of the earlier filing date of U.S. Provisional Patent Application No. 62/316,793, filed Apr. 1, 2016; each of these prior applications is incorporated herein by reference in its entirety.

FIELD

This disclosure relates to systems and methods for constructing connected planar fractures and wells that include injection and extraction points. Devices useful for these systems and methods are further disclosed, as well as systems and methods for EGS energy recovery.

BACKGROUND

Geothermal energy is a sustainable and renewable energy source. Engineered geothermal systems (EGS) can convert geothermal energy into electric power, such as by exposing a cold fluid to hot rock to transfer heat from natural or artificial fracture networks in the rock, to a turbine on the surface, through a series of wells. Conventional EGS systems generally incorporate at least two separate wells in their design, with one well used for injection of the heat transfer fluid and a second well used to extract the fluid, with the fluid permeating through porous and fractured rock between the two wells. These well systems are inefficient, as there can be significant loss of fluid between the wells due to incomplete capture of the fluid by the extraction well.

Geological conditions that are favorable for efficient EGS incorporate crystalline rock having a low permeability as a reservoir, which can retain a heat transfer fluid with significantly less fluid loss through the rock than with porous and naturally fractured rock. A single well system is advantageous for EGS in this type of rock, due to its lack of porosity. However, there is a need for convective coolant fluid flow across the fracture void space and the well for efficient energy recovery systems that are effective in crystalline, low-permeability rock and that are amenable to a single well EGS.

SUMMARY

Engineered geothermal systems are presented that include a well comprising a series of connected planar artificial fractures that intersect a wellbore of the well sequentially along its length, wherein a plane of each of the planar artificial fractures is aligned with an osculating fracture plane of the wellbore trajectory, and a heat transfer fluid. In some embodiments of these systems, the engineered geothermal systems presented can include a well that has a grouted support island and/or a well that includes a flow blockage in the wellbore section comprising the grouted support island. In any of these systems, the series of connected planar artificial fractures can additionally include a secondary fracture created by thermal enhancement of a planar artificial fracture.

Geothermal systems may also include an artificial fracture comprising a void space, a first point in the artificial fracture configured to be a fluid injection point, a second point in the artificial fracture configured to host a grouted support island, a third point in the artificial fracture configured to be a fluid withdrawal point, a well that intersects the artificial fracture at the first point, the second point, and the third point; and a grouted support island within the artificial fracture. In some embodiments, the first point and the third point are located at a distance from each other that is longer than a distance between the second point and either the first point or the third point. In certain embodiments, the second point is positioned between the first point and the third point and each point has flow connectivity between the void space of the artificial fracture and the well.

Methods for creating an EGS in a well section are also presented, where the well section comprises a host rock, an injection point, and an extraction point, by drilling a wellbore section in a direction normal to a minimum principal stress in the host rock, hydrofracturing the host rock by pumping fluid into the well section to form a planar artificial fracture comprising a void space in the planar artificial fracture, assessing a direction of the first planar artificial fracture, confirming that a trajectory of the wellbore section is aligned with the planar artificial fracture and its osculating plane by evaluating a directional difference between the osculating plane and the planar artificial fracture at a point where it intersects the wellbore, and using the directional difference to correct drilling direction for a subsequent wellbore section. These methods may, in certain embodiments, also include embodiments wherein the connected planar artificial fractures comprise overlapping fracture volumes that are made continuous by at least one of a planar intersection or a secondary fracture.

Devices that may be used in any of the disclosed methods or to create any of the disclosed engineered geothermal systems, are also presented. These devices have a body with a variable diameter, an upper inflatable packer, a central inflatable packer, a lower inflatable packer, an injection pipe orifice, an extraction pipe orifice, a plurality of flow velocity sensors, and a pressure sensor.

The foregoing and other objects, features, and advantages will becomes more apparent from the following detailed description.

BRIEF DESCRIPTION OF THE DRAWINGS

FIGS. 30A-30C illustrate additional representative embodiments of a system described herein.

DETAILED DISCUSSION

I. Terms

Figure 1:
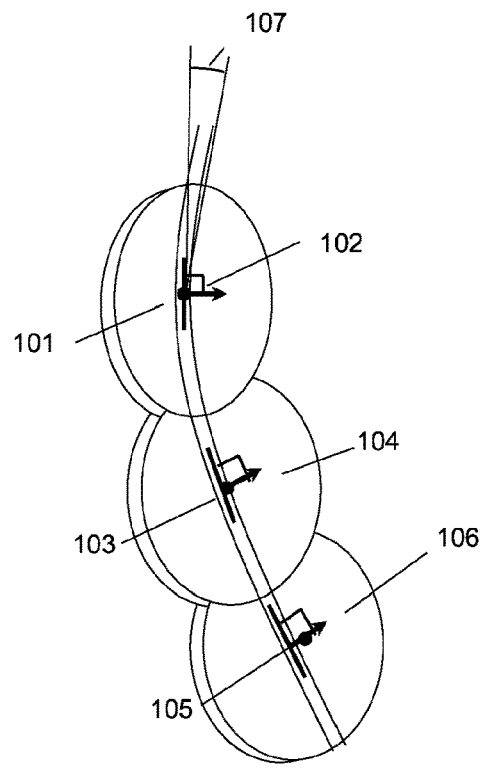
FIG. 1 is a schematic illustration of an embodiment of a well having three planar fractures.

The following explanations of terms and methods are provided to better describe the present disclosure and to guide those of ordinary skill in the art in the practice of the present disclosure. The term "or" refers to a single element of stated alternative elements or a combination of two or more elements, unless the context clearly indicates otherwise. The singular forms "a" or "an" or "the" include plural references unless the context clearly dictates otherwise. As used herein, "comprises" means "includes." Thus, "comprising A or B," means "including A, B, or A and B," without excluding additional elements.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. Any theories of operation are to facilitate explanation, but the disclosed devices, systems, and methods are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed components and materials can be used in conjunction with other components and materials. Additionally, the description sometimes uses terms like "produce" and "provide" to describe the disclosed methods and systems. These terms are high-level abstractions of the actual operations that are performed. The actual operations that correspond to these terms will vary depending on the particular implementation and are readily discernible by one of ordinary skill in the art with the benefit of the present disclosure. Examples are described with reference to directions indicated as "above," "below," "upper," "lower," and the like. These terms are used for convenient description, but do not imply any particular spatial orientation.

Unless otherwise indicated, all numbers expressing quantities of components, viscosities, percentages, temperatures, times, and so forth, as used in the specification or claims, are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. In some embodiments, the term "about" refers to an amount within a specific range of a value. For example, "about" a specific area or radius indicates within 5% of that area or radius amount. In a non-limiting example, "about" 100 feet refers to 95 feet to 105 feet. In addition, "about" a specific percentage refers to within 0.05%. In a non-limiting example, "about 2%" refers to 1.95% to 2.05%. Furthermore, not all alternatives recited herein are equivalents.

To facilitate review of the various embodiments of the disclosure, the following explanations of specific terms and abbreviations are provided:

Aligned: A wellbore that is "aligned" with a fracture plane overlaps the fracture plane to form a contiguous void space between the wellbore and fracture plane, thereby connecting the wellbore with the fracture plane.

Artificial Fracture: A rock fracture that is formed intentionally using external forces, such as hydrofracturing, in contrast to a naturally occurring rock fracture.

Cleaning Slurry: A slurry that is used to flush out a hardening slurry. Examples of cleaning slurry materials include, but are not limited to a bentonite slurry composition, clay mud, silica gel, or combinations thereof.

Connected Fractures: Fractures that have a contiguous void space, generally formed by overlapping the planes of the fractures. In some embodiments, a series of fractures are connected via the wellbore.

Extraction Point: An opening through which the fluid content of a well can be extracted. In some embodiments, the extraction point is the target, or endpoint, of a horizontal or a vertical well.

Hardening Grout Slurry: A slurry that comprises a bonding agent, solid particles, and carrying fluid. In some embodiments, the slurry may further comprise activator components. In some embodiments, the slurry comprises, but is not limited to, cement concrete, geoplastic concrete, or combinations thereof.

Hydrofracturing: Fracturing a rock with a pressurized liquid.

Injection Point: An opening through which a fluid or gas can be injected into a well. In some embodiments, the injection point is the surface location, or starting point, of a horizontal well or vertical well.

Minimum Principal Stress: A component of the three dimensional in situ stress in a rock. In some embodiments, a hydraulic fracture will propagate in a direction perpendicular to the minimum principal stress component.

Osculating Fracture Plane (to a well): A fracture having a predominantly planar geometry, the plane of which is tangential to the trajectory of a well, making it the osculating plane of the trajectory of the wellbore at a point.

Packer: A material that provides a seal between a wellbore wall and the outside of a pipe inserted in a well. The packer can be used to provide a temporary or permanent seal.

Planar Fracture: A void space in a rock fracture that is predominantly planar in shape, having a circular, elliptical, or rectangular shape and an aperture of the opening for the three dimensional void space, with the aperture being at least several orders of magnitude (e.g., $10^3$-times) smaller than the minimum dimension of the lateral extension of the fracture.

Ultra-High-Strength Geopolymer: A polymer that comprises a bonding agent, solid particles, and carrying fluid. In some embodiments, the polymer may further comprise activator components. In some embodiments, the polymer can comprise geoplastic concrete.

Void Apace: The opening volume between the walls of a fracture in a rock. In some embodiments, the void space may be empty, or it may be filled with a gas or a fluid.

II. Introduction

It can be difficult to establish an even fluid flow field in a planar-type fracture between the production and any injection or extraction connections in wells drilled in crystalline, low-permeability rock, which may be present in an engineered geothermal system (EGS). In such situations, the fluid flow rate is linearly proportional to the flow cross section and reciprocally proportional to the distance between the two connections. Consequently, the shortest flow pathway between the injection and the extraction connections is a preferential pathway. Any fluid flow loss along the shortest preferential pathway reduces the active surface area of the fracture for useful heat exchange in these geothermal systems.

The fractures in current EGSs are typically tight with very small apertures, on the order of a few tenth of millimeters. They are also typically thermo-elastic with the aperture increasing with increased circulation fluid pressure and decreased temperature in the rock strata due to thermal drawdown. Large injection pressures are often are used to keep the fracture open for low circulation flow resistance. However, large pressure drops along the fracture due to hydraulic resistance loss results in losing significant pumping energy for maintaining fluid circulation. In addition, the large pressure used to keep the elastic fracture open inevitably increases the fluid loss from the fracture volume to the surrounding hot rock. Recovery of the fluid loss is elusive as the extraction pressure also should be kept higher than the opening pressure of the fracture. The pressure-driven Darcy flow in a crystalline EGS is disadvantageous and often is responsible for both washing away thermal energy and loosing coolant fluid continuously to the environment.

In conventional systems, a good flow connection to a fracture may be made since the collar of the connection is enlarged by wear during the creation the fracture; however, it is more difficult to construct another well connection, as the intersection of the well with the fracture plane may not result in an open flow connection, such as at Fenton Hill (New Mexico, USA), which was the first EGS system made in the U.S., or at an EGS well at the Brady geothermal site (Nevada, U.S.). Even if the well is drilled through a surveyed fault, a hydraulic connection with the flow field in the fault may not be achieved. The EGS systems, methods and devices disclosed herein can address these problems.

III. Methods and Devices

Disclosed herein are embodiments of engineered geothermal systems (EGS). Also disclosed are methods and devices for the construction and use of planar artificial fractures in EGS wells, including wells that contain both injection and extraction points. These systems, methods and devices provide new solutions to mitigate problems in the designs of conventional EGS.

The new EGS arrangements and methods of constructing fractures can provide EGS fractures with continuous, longitudinal connection between the planar fractures and the well that may be used for creating the planar fracture by hydrofracturing. These systems and methods are predicted to create efficient geothermal wells for energy extraction, despite conventional thinking that fracturing a well creates a damaged well. A new, transformative coolant fluid flow control method also is disclosed, which may be used to apply grouting after fracture completion to each planar fracture, to provide permanent fracture propping and to block areas of high fluid flow losses, or "short circuits," where needed. In some embodiments, the disclosed EGS fracture systems can be fixed fracture aperture flow systems with low aperture sensitivity to fluid circulation pressure and flow rate. Since the fractures are not opened by the injection pressure of the coolant fluid by pumping during energy production, the disclosed EGS system can show low seismic activity during energy production operation. Large fracture apertures may be formed during fracture creation by hydraulic pressure and simultaneous injection of grouting material into the central area of each planar fracture, thereby keeping the fracture aperture open without fluid pressure support. The grouted support islands created in the planar fracture void space also can be used to block the flow along preferential, short-circuit pathways in the fracture plane along the intersected well section. Thus, the flow is directed to other areas of the fracture, such as the peripheries of the fracture that would not otherwise be accessible to fluid flow.

Additional approaches to further mitigate problems with conventional EGSs are described herein. In some embodiments, methods of cooling the fracture surfaces by periodically emptying and flooding the fracture volume with a coolant fluid throughout a single connection are disclosed. Using the fixed-aperture fracture system disclosed herein, weak cross-flow areas for circulatory cooling are avoided. In some embodiments, a well-fractured EGS geothermal heat exchanger (GHE) unit with a large heat transfer surface area with the hot rock strata can be used with a single well connection to the surface for energy extraction. In yet additional embodiments, single-connection systems, huff-puff-type flow systems, or two-phase (fluid-gas) coolant fluid delivery solutions that require only a single well connection to the fracture void space (e.g., such as those disclosed by U.S. Pat. No. 8,430,166, which is incorporated by reference herein in its entirety) can be used in combination with the disclosed systems and methods. The systems, methods and devices disclosed herein also can establish cross-flow-type coolant fluid circulation over a large GHE surface area between two separated wells, wherein one well is used for fluid injection and the other well is used for extraction.

A. Methods and Devices for Forming Planar Artificial Fractures

Described herein are methods for creating a series of connected planar fractures aligned and connected to a well with low flow resistance. In some embodiments, the well is connected to the rock strata with a large heat transferring surface area, as a geothermal heat exchange (GHE) unit. In some embodiments, the methods use directional drilling along the expected fracture plane to ensure that the series of fracture planes are connected to each other in addition to being connected to the well. The control of the tangential direction of the well during drilling is used to ensure that the fracture plane locally incorporates, or overlaps with, the trajectory of the well. The well may be directionally drilled at every location according to the measured microseismic event locations detected during sequential hydrofracturing of each fracture within the series of connected planar fractures. Alternatively, the well may be directionally drilled at a subset of locations detected during sequential hydrofracturing of each fracture within the series of connected planar fractures.

In some embodiments, a planar fracture is a void space in rock that has a shape that is described as being predominantly planar, and having a circular, elliptical, or rectangular shape with an aperture of the opening for the three dimensional void space. In some embodiments, the aperture can be at least several orders of magnitude (e.g., $10^3$-times) smaller than the minimum dimension of the lateral extension of the fracture. In some embodiments, the fracture is completely planar, meaning that over 95% of the void space is contained within the plane. In certain embodiments, between 20% and 80% of the void space is contained within a plane. In yet additional embodiments, between 40% and 80% of the void space is contained within a plane. In yet some additional embodiments, at least 50%, at least 60%, or at least 75% of the void space is contained within a plane.

In particular described embodiments, the well may be drilled into the tangent direction of the expected artificial fracture plane to become its osculating plane, and its drilling direction need be corrected only periodically as is practical and desired (e.g., within a well section equal or less in length than the radius of the planar artificial fracture). The radius of a planar artificial fracture created using the methods disclosed herein, can range from 5 m to 500 m, such as from 10 m to 250 m, or from 20 m to 100 m. In some embodiments, the drilling direction can accept periodic local geological deviations in a subset of the sections of the well along the length or trajectory of the well, but can still maintain periodic osculating agreement by drilling in a controlled direction, keeping a moderate average distance between each section of the series of planar fractures. Thus, in some embodiments, a moderate average distance is maintained between the partially overlapping planar fracture elements of less than the typical, secondary thermal enhancement fractures formation; e.g., 0.5 m to 2 m in penetration in a direction normal to the planes of the fracture elements for hydraulic flow connections through their separating rock layer.

In certain embodiments, the average distance between partially overlapping planar fractures is between 0.1 m and 5 m, such as between 0.2 m and 2 m or between 0.5 m and 1 m. The series of partially overlaying planar fractures can include both artificial and natural fractures. In one embodiment, the series of connected planar fractures comprises a first planar artificial fracture and a second planar artificial fracture. In further embodiments, the series of connected planar fractures comprises a planar artificial fracture, a planar natural fracture, or a mixture of planar artificial and natural fractures.

Figure 2:
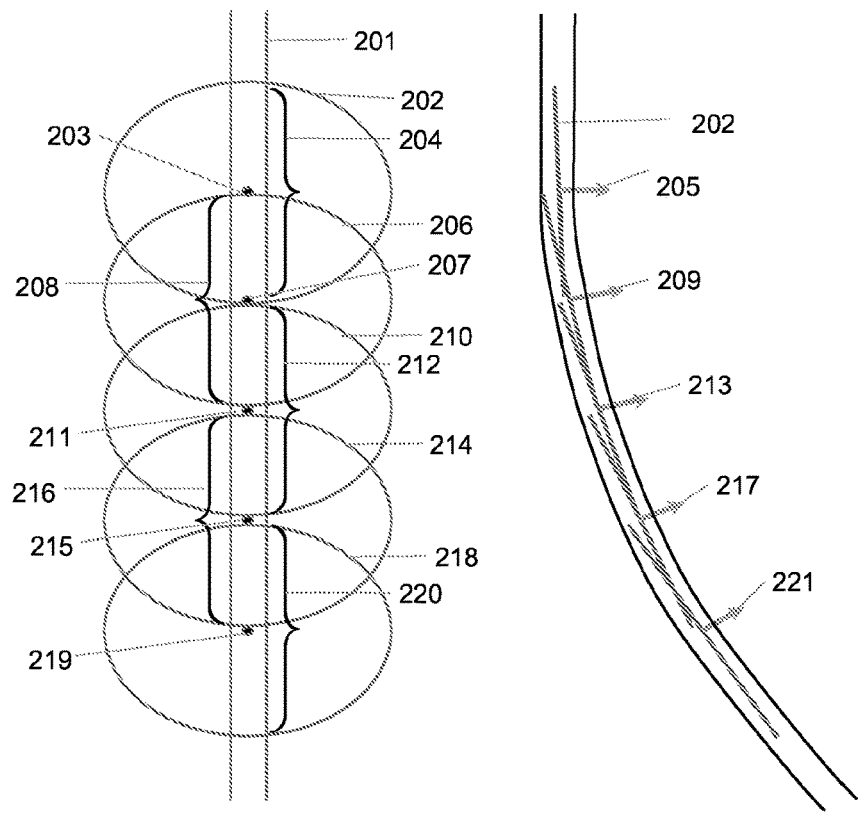
FIG. 2 is a schematic illustration of an additional embodiment of a well having five planar fractures, where the well is viewed from a direction normal to the fracture planes (left illustration) and from a direction directly perpendicular to the fracture planes, showing the fracture planes from the side, as lines intersecting the well (right illustration).

An embodiment of a series of fractures around a well using fracture-radius-overlapping-geometry (FROG) is described herein and shown in FIG. 1 and FIG. 2. The embodiment illustrated in FIG. 1 includes the following components: 101 is a center point on a first planar fracture; 102 is a direction of the minimum principal stress at point 101; 103 is a center point of the second planar fracture; 104 is a direction of the minimum principal stress at point 103; 105 is a center point of the third planar fracture; 106 is a direction of the minimum principal stress at point 105; and 107 indicates the angular deviation of a wellbore for directional correction in the well section shown. The embodiment illustrated in FIG. 2 includes the following components: 201 is a well; 202 is a first planar fracture; 203 is the center of the first planar fracture; 204 is a well segment for pressure isolation for the first fracture; 205 is the vector of minimum principal stress at point 203; 206 is a second planar fracture; 207 is the center of the second planar fracture; 208 is a well segment for pressure isolation for the second planar fracture; 209 is the vector of minimum principal stress at point 207; 210 is a third planar fracture; 211 is the center of the third planar fracture; 212 is a well segment for pressure isolation for the third planar fracture; 213 is the vector of minimum principal stress at point 211; 214 is a fourth planar fracture; 215 is the center of the fourth planar fracture; 216 is a well segment for pressure isolation for the fourth planar fracture; 217 is the vector of minimum principal stress at point 215; 218 is a fifth planar fracture; 219 is the center of the fifth planar fracture; 220 is a well segment for pressure isolation for the fifth planar fracture; and 221 is the vector of minimum principal stress at point 219.

After finishing drilling over the well section shown in 204, drilling is suspended and drilled well section 204 is isolated by two expandable packers (not shown). Fracture 202 is created by pressurizing well section 204 to a fracture opening pressure that exceeds the minimum principal stress, acting in the direction of vector 205 over well section 204 of the well to be fractured. Fracture 202 is opened to its maximum target aperture if desired, which may be, in a non-limiting example, 10 mm, at center point 203. An opening can be monitored real-time during fracturing if desired. The fracture may be optically surveyed along the well by a borehole camera over its longitudinal intersection with the well bore and recorded for stress field evaluation by techniques known to a person of ordinary skill in the art with the benefit of the present disclosure. Microseismic data can be collected during fracturing for the determination of unknown site and fracture parameters for stress field and opening pressure evaluation, which may be used for creating the next fracture 206 along the well.

In some embodiments, the direction of the intersection of the fracture opening with the wellbore wall can be used to determine the deviation from the desired intersection direction that is to be kept parallel with the axis of the well. The drilling direction can be corrected for the next well section, such as shown in FIG. 2 as section 208 of the well. The process of creating half-fracture-diameter overlapping fractures may be repeated in a sequential manner. To repeat the next fracture element 206, drilling over half of well section 208 is completed. Drilled well section 208 is isolated by two expandable packers and fracture 206 is created by pressurizing well section 208 to the fracture opening pressure, and so on, with five half-fracture-diameter overlapping fractures shown in the example of FIG. 2.

Figure 3:
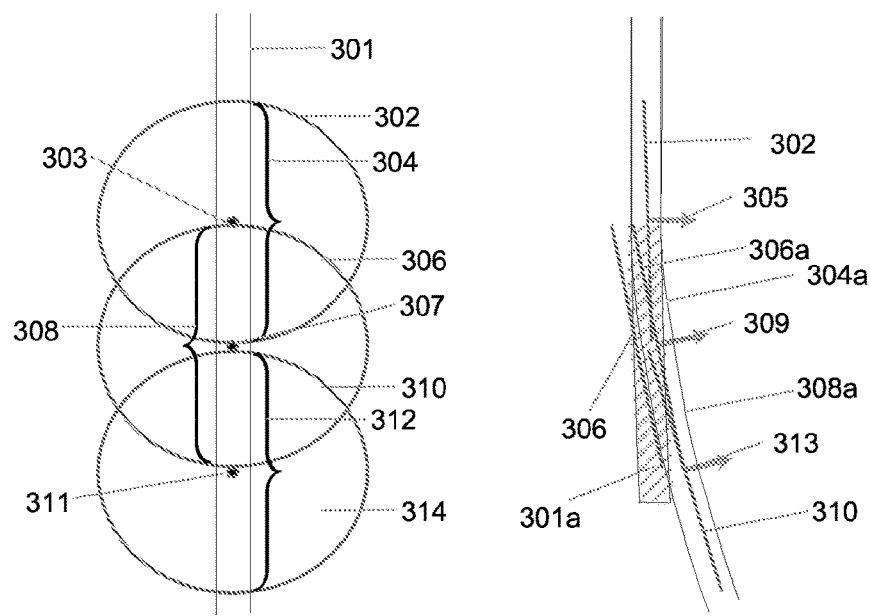
FIG. 3 is an additional schematic illustration of the uppermost three fracture planes of the well shown in FIG. 2, where the well is viewed from a direction normal to the fracture planes (left illustration) and from a direction directly perpendicular to the fracture planes, showing the fracture planes from the side, as lines intersecting the well (right illustration).

Directional deviations between FROG fracture elements can be evaluated and can be either accepted or corrected by re-drilling into the corrected direction and re-fracturing. Re-drilling a well section into the corrected direction may be performed. In cases where the correction is excessive, it can be accomplished within the next drilling section to obtain intersection alignment between the well and the planar fractures. An alignment correction is shown as an example for part of well section 304 and well section 308, as illustrated in FIG. 3, showing the following components: 301 is a well; 302 is a first planar fracture; 303 is a well segment for pressure isolation for the first planar fracture; 304 is a well segment for pressure isolation for the first fracture; 305 is the vector of minimum principal stress at point 303; 306 is a second planar fracture; 307 is the center of the second planar fracture; 308 is a well segment for pressure isolation for the second planar fracture; 309 is the vector of minimum principal stress at point 307; 310 is a third planar fracture; 311 is the center of the third planar fracture; 312 is a well segment for pressure isolation for the third planar fracture; 313 is the vector of minimum principal stress at point 311; 301*a* is the plugged well sections 304 and 308; 304*a* is the re-drilled well section 304; 306*a* is a new fracture parallel to 306; and 308*a* is the re-drilled well section 308.

Insufficient alignment is shown to be detected from surveying within well section 308 with fracture 306. The expected result of re-drilling is shown in the right illustration of FIG. 3, with wellbore section 308 (hatched) and part of well section 304 backfilled by a cemented plug and where new well sections 304*a* and 308*a* are drilled into a corrected direction based on the direction of fracture 306. Fracturing is repeated in well sections 304*a* and 308*a*, and the process continues to the next well section.

Figure 4:
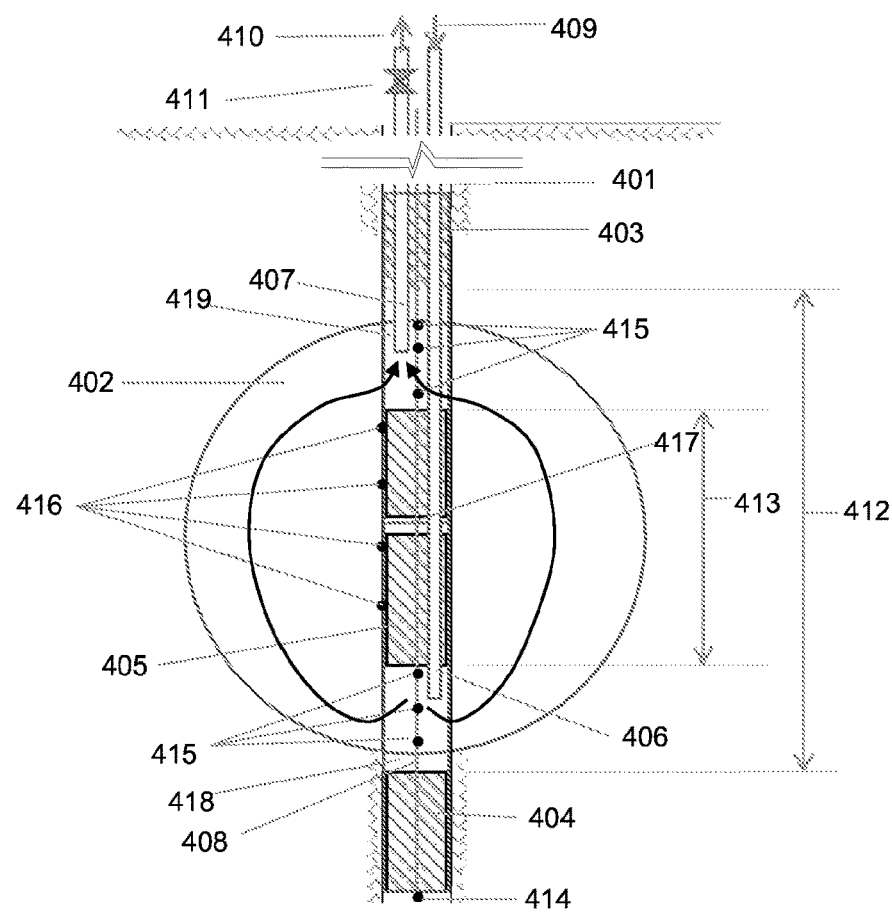
FIG. 4 is a schematic illustration of an embodiment of a fracturing and testing device that may be used to form planar artificial fractures.

The elements of the series of FROG fractures may be created and evaluated using embodiments of the fracturing and testing device shown in FIG. 4, which can include the following components: 401 is a well; 402 is a planar fracture; 403 is an upper inflated packer; 404 is a lower inflated packer; 405 is a central inflated packer; 406 is an injection pipe; 407 is an extraction pipe, 408 is the body of the device; 409 is a pipe for fluid injection and pressurization; 410 is a pipe for fluid extraction; 411 is a backpressure control valve; 412 is a well section having the target fracture of diameter D; 413 is the length of the central inflatable packer; 414 is an optical sensor; 415 are flow velocity sensors; 416 are borehole cross-section and fracture aperture sensors; 417 is a pressure sensor; 418 is a downhole open well section; 419 is an uphole open well section.

The device illustrated in FIG. 4 is set for a target fracture diameter 412 and is lowered to the section of well 401 to be hydrofractured. The well can be optically surveyed with camera 414 for mapping and evaluating existing fracture features intersecting the well section from previous fracturing or from natural occurrences. The cross-section profile of the well can be mapped and the well pressure recoded by pressure gauge 417 for stress distribution analysis, using methods known in the art with the benefit of the present disclosure. Expandable packers 403 and 404 are expanded to isolate well section 412.

With continued reference to FIG. 4, fracturing fluid can be pumped through pipe 406 at or above the opening pressure to create fracture 402 along well section 412. The fracture aperture may be measured with sensors 416 at center points as well as along well section 412 at a series of points to map the fracture opening. Deformation of cross-sections of the well at least at the center point area can be mapped for stress field analysis by known methods in the art with the benefit of the present disclosure using one of sensors 416. The fracture opening pressure is adjusted to reach the desired maximum fracture aperture at center point, e.g., 0.01 m in some embodiments. In certain embodiments, the fracture aperture is between 0.0001 m and 0.2 m, including between 0.001 m and 0.1 m, and between 0.005 and 0.02 m.

Also with reference to FIG. 4, the fracture opening pressure can be confirmed from gauge 417 for stress field analysis and verification in some embodiments. Shut-off and back flow measurement through pipe 406 may be made on the surface to evaluate the total open void volume of fracture 402. Back flow velocity distribution along the axis of well section 412 can be measured by known methods using flow sensors 415. The spatial distribution of the back flow distribution from planar fracture 402 to the well along well section 412 can be evaluated using the fluid flow conservation law as a confirmation of the hydraulic connection for sufficient intersection areas between the artificial planar fracture and well 401. Fracture 402 may be re-opened by pumping pressurized clearing fluid through pipe 406 and well section 412 and fracture 402 can be flushed free of the fracturing fluid by flow circulation via back circulation pipe 407 under fracture-opening pressure. The back pressure in pipe 407 is controlled during flushing by valve 411 on the surface. For testing, packer 405 at the center of well section 412 is expanded to close the flow path in well section 412. Clearing fluid is injected through pipe 406 to the downhole end of well section 412 and withdrawn via back circulation pipe 407 from the opposite end of well section 412 (arrows), which is kept at the fracture opening pressure downhole with the adjustment of pressure control valve 411. The fluid velocity field along well section 412 is measured with flow velocity sensors 415, which are not covered by packer 405, for verification of the circulation between well sections 418 and 419 through the open aperture of planar fracture 402. The position of the fracturing and testing device can be recorded for positioning a grout injection tool (described below) for the completion of the fracture at a later phase.

In some embodiments, the fracturing and testing device shown in FIG. 4 is repositioned along well 401 to re-fracture a different well section in case the flow communication between the opposite ends of well section 412 is not satisfactory. Repositioning the device will assign well section 412 to a different, absolute geometrical location along well 401, providing an opportunity to improve flow communication over a new section of well 401.

In one embodiment, the optimum position of the device is determined by giving the maximum flow rate for the same pressure difference (e.g., a moderate pressure difference of 1 bar) applied to drive the circulation flow between the opposite ends of well section 412 through the planar fracture. In some embodiments, the target fracture diameter 412 in the fracturing and testing device shown in FIG. 4 is adjustable. The optimum diameter D setting of the fracturing and testing device may be determined by giving the maximum flow rate for the same pressure difference used to drive the circulation flow between the opposite ends of well section 412 for a given position of the device.

In certain embodiments, length 413 of central packer 405, L, is adjusted together with fracture diameter of section 412, D, e.g., to be of one third of it, L=D/3. The optimum center position location of the tool, the optimum fracture diameter D, and the length of the central packer, L can be recorded to perform additional steps in the FROG fracture system, such as grouting for applying the EGS energy extraction as a GHE unit.

B. Methods and Devices for Forming a Grouted Support Island

A new, transformative, fracture aperture and fracture flow control system is disclosed herein, which can establish a permanent fracture aperture support island inside the fracture plane around the center of the planar fracture by grouting. Forming a grouted support island simultaneously creates (a) a stress-bearing support that can keep open the fracture opening without the need for high fluid pressure during thermal energy extraction operation; and (b) forms a blockage for any coolant fluid short circuiting that may occur along the planar fracture and the well section with which the planar fracture forms an osculating plane.

The radial extent of the support island is controlled by the volume of injected grout, and may be significantly smaller than that of the fracture, e.g., a third of the radius of the planar fracture, leaving ample fracture volume and surface area clear of the grout for efficient fracture flow and heat convection. The radius of the grouted support islands placed within a planar fracture created using the methods disclosed herein ranges from 0.2 m to 150 m, including from 2 m to 50 m, and from 5 m to 10 m. In certain embodiments, the volume of the grouted support islands is between 1 cubic meter and 1000 cubic meters, including between 2 m$^3$ and 500 m$^3$, and between 5 m$^3$ and 50 m$^3$.

Figure 5:
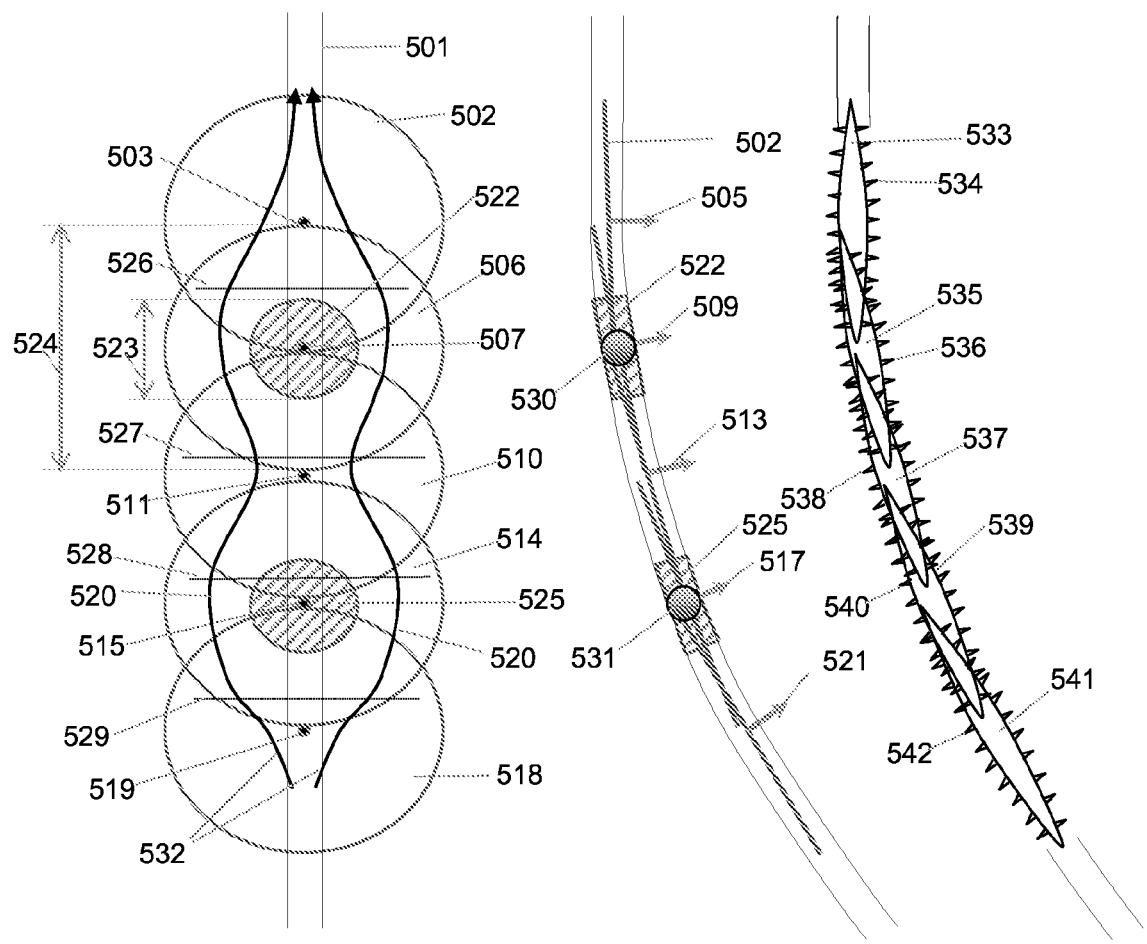
FIG. 5 is a schematic illustration of an embodiment of series of connecting planar fractures that contain grouted support islands, where the well is viewed from a direction normal to the fracture planes (left illustration) and from a direction directly perpendicular to the fracture planes, showing the fracture planes from the side, as lines intersecting the well (right two illustrations).

Representative grouted islands in a series of planar fractures are illustrated in FIG. 5, which can include the following components: 501 is a well; 502 is a first planar fracture; 503 is the center of a first planar fracture; 505 is the vector of minimum principal stress at point 503; 506 is a second planar fracture; 507 is the center of a second planar fracture; 509 is the vector of minimum principal stress at point 507; 510 is a third planar fracture; 511 is the center of a third planar fracture; 513 is the vector of minimum principal stress at point 511; 514 is a fourth planar fracture; 515 is the center of a fourth planar fracture; 517 is the vector of minimum principal stress at point 515; 518 is a fifth planar fracture; 519 is the center of a fifth planar fracture; 521 is the vector of minimum principal stress at point 519; 522 is a grouted island for aperture support for fracture 506; 523 is a grouted island diameter in fracture 506; 524 is the fracture diameter, D; 525 is a grouted island for aperture support for fracture 514; 526 is an intersection connection between fractures 502 and 506; 527 is an intersection connection between fractures 503 and 510; 528 is an intersection connection between fractures 510 and 514; 529 is an intersection connection between fractures 514 and 518; 530 is a flow block through grouted island support for fracture 506; 531 is a flow block through grouted island support for fracture 514; 532 is a coolant fluid flow path through the competed fracture system; 533 is a first void space of fracture 502; 534 is a second void space of fracture 502 from secondary fracturing by cooling enhancement; 535 is a first void space of fracture 506; 536 is a second void space of fracture 506 from secondary fracturing by cooling enhancement; 537 is a first void space of fracture 510; 538 is a second void space of fracture 510 from secondary fracturing by cooling enhancement; 539 is a first void space of fracture 514; 540 is a second void space of fracture 514 from secondary fracturing by cooling enhancement; 541 is a first void space of fracture 518; and 542 is a second void space of fracture 518 from secondary fracturing by cooling enhancement.

In the embodiment shown in FIG. 5, a hardening grout slurry is injected into selected fractures 506 and 514 of the FROG fracture series, wherein the fractures are opened to the desired aperture either before or during the injection of the grouting slurry. Grouting islands 522 and 525 can be created from their center points 507 and 515, respectively. The other, overlapped planar fractures 502, 510, and 518 optionally may not be opened by support islands at their center points 503, 511, or 519, as shown in the middle illustration of FIG. 5 for simplicity. In some embodiments, they are also filled with small, grouted support islands with open borehole access through them. Such embodiments may be useful for cross-flow connection of the coolant fluid during geothermal energy extraction.

The hardening grout through the centers of grouting islands 522 and 525 may be removed from the well sections during support island creation. In this case, temporary or permanent coolant fluid flow blockages 530 and 531 are placed at center points 507 and 515 for flow path control, by blocking the preferential pathway in well 501 (FIG. 5). The resultant flow paths 532 are expected from numerical simulation. The crossing of the flow paths from one planar fracture to the other is expected through the flow channel within the open well bore and the intersected area between the elements of the FROG fractures 526, 527, 528 and 529. In an ideal reservoir site with a homogenous and isotropic rock strata and an in situ stress field, all planar fractures lay in the same plane, osculating their straight well, either in vertical, horizontal, or an arbitrary direction, as dictated by the stress field. For the non-ideal cases due to changes in, for example, the in situ stress field, the disclosed methods can take into account the deviations using an engineered solution to avoid unsuccessful field trials or trial-and-error experiments.

Figure 6:
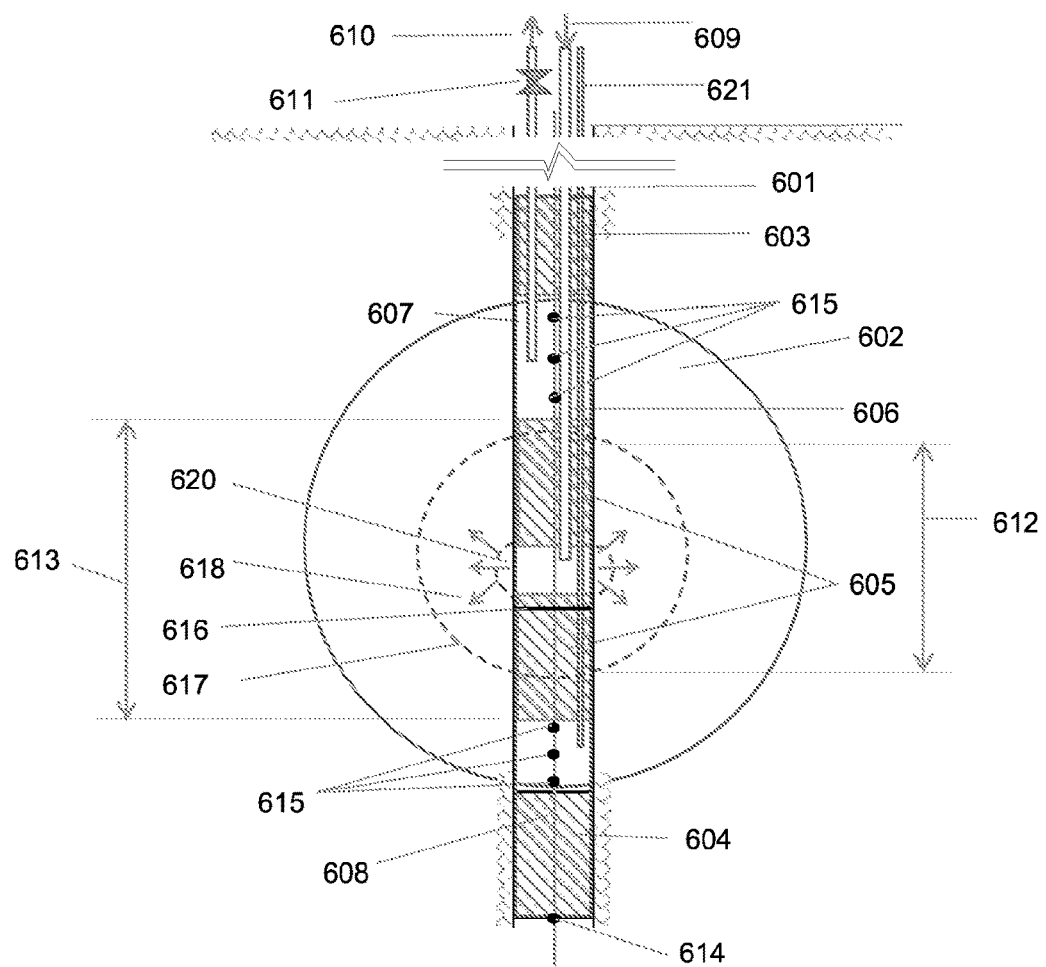
FIG. 6 is a schematic illustration of an embodiment of a grouting device that may be used to form grouted support islands in a planar fracture.

In some embodiments, the grouted support islands are created with the help of a grouting device, shown in FIG. 6, which can include the following components: 601 is a well; 602 is a planar fracture; 603 is an upper inflated packer; 604 is a lower inflated packer; 605 is a central inflated packer; 606 is an injection pipe; 607 is an extraction pipe, 608 is the body of the device; 609 is a pipe for fluid injection and pressurization; 610 is a pipe for fluid extraction; 611 is a backpressure control valve; 612 is a well section having the target fracture of diameter D; 613 is the length of the central inflatable packer; 614 is an optical sensor; 615 are flow velocity sensors; 616 is a borehole cross-section and fracture aperture sensor; 618 is a grouting slurry; 619 is the desired volume of hardening grout; 620 is a flushing slurry volume in fracture 602; and 621 is a fluid injection pipe.

The grouting device can be inserted in well 601 and aligned with the center of fracture 602, the pre-surveyed and selected element of the series FROG fractures. The device is set for a target fracture diameter for section 612. Expandable packers 603 and 604 are expanded to isolate well section 612. The split central packer 605 may also be expanded to seal the well from axial fluid flow. Grouting slurry fluid 618 is pumped through pipe 606 at or above the fracture opening pressure to inject a pre-determined volume of hardening slurry into the void space of fracture 602. The fracture aperture is measured with sensor 616 at the center of fracture 602, via an analysis of the deformation of a cross section of the well or by other known methods. The fracture opening pressure is adjusted by back pressure control valve 611, resisting the flow through extraction pipe 607 to reach the desired maximum fracture aperture at center point from sensor 616, e.g., 0.01 m in some applications during grouting injection.

In some embodiments, flushing fluid may be injected back into the fracture through extraction pipe 607 (FIG. 6). After the pre-determined, desired volume of hardening grout 618 is injected, while maintaining the same fracture opening pressure, the hardening grout may be flushed out by injecting flushing slurry from injection pipe 606, leaving a pocket of non-hardening clearing slurry fluid in the center of spit central packer 605 and center area 620 of fracture 602 (FIG. 6). The grouting device can be kept at position and under constant pressure until the hardening grout is cured to reach its desired compressive strength to balance the load from the in situ stress field at the location.

In an embodiment, the grouting tool is provided with a third pipe, fluid injection pipe 621, for performing a downhole circulation test between the opposite ends of central inflatable packer 605 (FIG. 6). Circulation is created by injecting cleaning fluid via injection pipe 621 and extracted by pipe 607 (FIG. 6). The pressure requirement and the circulation flow rate are both measured at the surface to evaluate the potential to pump fluid into the completed fracture, as a quality test of the completed fracture with the stabilized opening aperture and internal fluid field control provided simultaneously by the grouted support island in place. In some embodiments, the fracturing and testing device and the grouting and testing device are made of common, interchangeable, modular components for maintenance and cost savings, or as an integrated, universal, multi-purpose device in one body, if desired.

C. Methods of Thermal Enhancement to Develop Secondary Fracture Networks

In an embodiment for assuring the success of a circulation test between the opposite ends of a well section, such as well section 612 of FIG. 6, thermal enhancement can be applied by the prolonged circulation of cooling fluid (e.g., for a few hours or days) via pipes 606 and 607, keeping fracture 602 open by applying an opening pressure. Even a weak cooling fluid circulation in artificial planar fracture 602 can develop secondary fractures growing in a direction normal to planar fracture 602, due to thermal contraction of the rock strata, reaching through the blockages separating areas of each of the planar elements of the series of FROG fractures. The improvement in connectivity is recorded for model simulation calibration to extrapolate permeability characteristics of the fracture flow system as a function of opening fracture aperture and strata temperature change due to cooling, using a known coupled thermal hydrologic model. In one embodiment, the pressure used for the fracture aperture opening is increased to ensure a sufficient initial opening to initiate sufficient coolant circulation.

In a further embodiment, the advance distance, A, between the elements of the FROG fracture system along well 601 in FIG. 6 is decreased from fracture radius A=R=D/2 to A=D/3, or smaller, as is practical, for obtaining sufficient cross-circulation between the opposite ends of well section 612 through the addition of more overlapping planar fracture elements (per FIGS. 1-3). The proper choice of small advance distances between consecutive fractures may be determined, to form a contiguous fracture along the well, creating a close to ideal FROG fracture system over the entire desired length of well.

In certain embodiments, a combination of the techniques described herein is used with (a) investigative re-fracturing with small incremental advances along the well; (b) multiple overlapping fracturing with small longitudinal advance distances to provide a continuous flow connection between fracture elements; (c) an investigative search for the optimum, connectable fracture diameter, D; and (d) prolonged thermal enhancement over persistent well sections for connecting the fluid flow between neighboring, overlapped elements of the FROG fracture system. A difficult well section due to complex, local geological formation and/or fast-changing in situ stress directions also can simply be skipped with persistently unconnected sections between the opposite ends of well section 612 (in FIG. 6), and abandoned for energy extraction without jeopardizing further well sections in better geology from successful use in the same reservoir.

IV. Systems for Enhancing Energy Extraction from Geothermal Wells

Certain advantages of the methods and devices disclosed herein over conventional EGS methods include, but are not limited to, the features that the injection and the extraction points are both created from the same well; thus, both points are assured to be in good flow connection with the well. In addition, the void space of the fractures originating from the injection and extraction points also are connected to each other either though their planar, continuous alignment and contiguous extension, or by their planar intersection, or via intermediate, partially overlapped and/or intersected fractures that allow them to be contiguous for fluid flow within the fracture. Thus, the engineered creation of a series of fractures from the well assures that all elements will be connected to the same well. The contiguous connection through their void spaces can be assured by the fact that the fractures are made in an overlapping and sequential fashion as densely as desired. If the overlapped fractures are slightly misaligned, the neighbors can be kept in fracture flow connection by spacing them within the distance of the penetration depth of secondary fractures normal to the primary fractures due to tangential thermal contraction during the thermal enhancement phase of EGS creation.

Furthermore, Darcy flow in the fractured rock strata within a short distance and over a large flow cross section of the overlapped fracture surfaces provides an initial flow bridge between overlapping fracture areas to initiate cooling and the growth of secondary fracture connections, as evidenced by known experimental and modeling exercises.

Certain embodiments of preparing, testing and finishing an engineered geothermal energy recovery GHE unit for energy production, may be accomplished in six steps, including, but not limited to: (i) evaluating the EGS site and accessing the in situ stress conditions from test drilling along a well (such as shown in FIG. 1); (ii) creating a series of FROG fractures around the well as described herein, with a step-by-step drilling and fracturing sequence; (iii) verifying the success of the convective cross-flow communication, if desired, by inserting the testing device between injection and extraction points of the FROG fracture or fractures along the well, separated by a distance characteristically close to the diameter of the planar FROG fracture or fractures; (iv) opening a selected element of the FROG fractures to the desired aperture at the center point by applying an opening pressure, and stabilizing the open aperture by (a) delivering support proppant and/or (b) injecting hardening grout to fill the fracture in a circular support island of, e.g., D/3 in diameter and cleaning the well by flushing out the proppants and the grout from the well; (v) re-testing each of the selected elements of the FROG fractures, if desired, by temporarily isolating its section in the well with the testing device and measuring the convective cross-flow connectivity between the injection and extraction points; and (vi) activating the selected elements of the successful FROG fractures by blocking their center points in the well temporarily for further circulation flow testing, or permanently for EGS energy production operation.

Also presented herein are new methods for enhancing energy extraction in geothermal wells, comprising creating dual (or multiple) near-parallel, planar fractures (referred to as "DOMNPP fractures") at close vicinity to each other, overlapping and/or intersecting each other at least partially wherein their distance from each other being within the thermal penetration depth in the rock strata during the short time of reservoir creation under cooling circulation (e.g., in a few hours or days). The methods can further comprise subsequent thermal enhancement of the fracture apertures of the planar fractures by coolant fluid circulation firstly within each fracture for creating secondary cracks normal to the corresponding fracture planes, and subsequently with further coolant fluid circulation between the members of the dual, or multiple planar fractures. The new, dual, or multiple, planar fractures may be used as a connection junction between two EGS wells, or as a dual or multiple planar fracture GHE unit of very low hydraulic resistance.

In some embodiments, the individual elements of the DOMNPP fractures are created using the fracturing and testing device illustrated in FIG. 4. The device can be used for hydrofracturing a section of well and performing downhole cooling fluid circulation in the fractured well section at or above the fracture opening pressure for the creation of secondary fractures around each planar fracture into a direction normal to the fracture plane, to reach the neighbor element or elements of the DOMNPP fractures for flow connectivity between the neighbor planar fractures. In certain embodiments, the fracture aperture of each element of the DOMNPP fractures is opened by a grouted support island using a hardening grout injection, which may include using the grouting and testing device illustrated in FIG. 6. In further embodiments, the individual elements of the DOMNPP fractures can be created first by hydrofracturing and then completed by a creating grouting support island using a combined fracturing and grouting device in an integrated design.

In some applications, the DOMNPP fractures are used for establishing a coolant fluid flow circulation connection between the ends of two wells, for example, where the first well is drilled for coolant fluid injection and the second well drilled for heated fluid extraction, whereas the end sections of the two wells converge to contact each other within a short distance. In one embodiment, the first element of the DOMNPP fractures is created at the end section of the first well, and the second element of the DOMNPP fractures is created at the end section of the second well, with a convective flow path for fluid flow established between the end sections of said first and second wells via secondary fractures around the said first and second fracture elements of the connected DOMNPP fractures.

In yet additional embodiments, the methods and systems described herein contemplate embodiments where a test artificial planar fracture is made from a main well without any pre-determination. The fracture can be surveyed during hydrofracturing using microseismic cloud measurements and then directional drilling takes place along a side-branch of the main well, which can be drilled from the main well (e.g., see FIG. 24) into the fracture so it intersects the fracture through multiple points. The flow connection between the planar fracture and the side-branch well can then be evaluated over the intersection points and three main points (or well sub-sections) that exhibit a desired flow connectivity can be selected for efficient fluid flow connection. The fracture can then be opened with an injected, grouted support island in the middle point of the planar fracture. An exemplary embodiment is illustrated by FIGS. 30A-C. FIG. 30A shows well intersections with a predominantly planar artificial fracture and FIGS. 30B and 30C show two fracture shapes and two well trajectory shapes wherein one is a planar fracture intersected by a curved well (FIG. 30B) and the other is a predominantly planar, rugged fracture intersected by a straight well (FIG. 30C). With reference to FIGS. 30A-C, 3001 is a well; 3002 is a predominant planar artificial fracture or an artificial fracture close to a planar geometry; 3003 is a first selected point as injection point; 3004 is a second selected point as withdrawal point; 3005 is a third selected point as center of grouted island and coolant fluid blockage; 3006 is a grouted island and coolant fluid blockage; and 3007 represents a coolant fluid.

V. Methods for Proppant Delivery

Vertical and/or horizontal fractures are expected at great depths in hot, low-permeability, metamorphic crystalline rock formations. It is difficult to deliver solid and settling particles into a fracture having a considerable radius from its center injection point into a radial direction, and especially into vertical, upward areas relative to the delivery point.

A new proppant delivery process is disclosed herein to deliver proppants to a large vertical fracture. A system is presented for the creation of a planar hydrofracture with large heat transferring surface area, and connected to a fluid circulation well with low flow resistance as a new geothermal heat exchanger (GHE) unit. The new fracture system and proppant delivery process are disclosed together to create a large vertical fracture which requires low injection pressure for maintaining sufficient fracture aperture. In yet other embodiments, horizontal fractures can be created. Alternating fluid delivery system with a tandem cooling arrangement is disclosed for continuous energy production from an EGS geothermal energy system. Solutions to energy recovery from dual GHE arrangements are described showing flow systems with tandem or multiple fractures with heat exchangers to extract geothermal energy. Alternating fluid flow cycles are designed with the combination of advection and fluid mixing within the fracture, pushing coolant to fracture areas which are hard to reach by continuous advection flow.

The disclosed fracture orientations, which are aligned with the well's centerline, mitigates certain problems with flow delivery. The delivery of proppants by introducing a slurry in vertical fractures is helped by gravity, allowing for the delivery of high-density, solid particles to great distances from the top to the bottom of the fracture. Proppants may be delivered using embodiments of the system described in FIG. 7, which can include using a system with the following components: 701 is a well; 702 is a planar fracture; 703 is a proppant delivery trummy pipe; 704 are proppants; 705 shows the slurry flow; 706 is a circulation pipe; and 707 shows the recirculation of carrying fluid.

Figure 7:
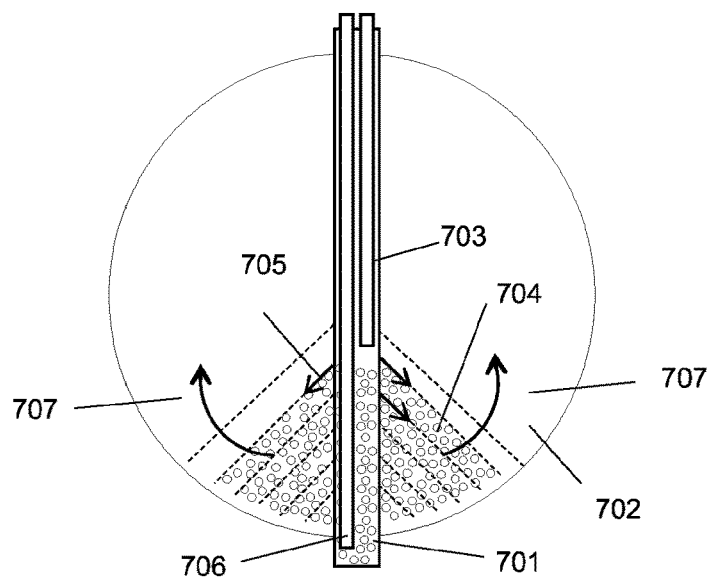
FIG. 7 is a schematic illustration of an embodiment of a method wherein a proppant is delivered to a planar fracture.

FIG. 7 shows an embodiment of the delivery method that may be used with vertical fractures, the planes of which are aligned with the centerline of the well that is used for hydrofracturing. However, the embodiment disclosed herein are not limited to use with vertical fractures and can be applied in embodiments utilizing horizontal fractures as well. Directional drilling is used to follow the in situ stress field and to control the alignment between the centerline of the well and the fracture plane. It is known from rock mechanics that the normal vector of the fracture plane is parallel with the direction of the minimum principal stress in the rock. Therefore, the direction of the well centerline should be kept normal to the minimum principal stress in the host rock, which can be determined using methods available to a person of ordinary skill in the art with the benefit of the present disclosure. A sequential series of drilling and hydrofracturing steps may also be used, wherein such steps can include drilling normal to the assumed direction 102 until the center point 101 of the fracture is reached (with reference to FIG. 1); hydrofracturing by pumping high-pressure fluid into the well; and assessing the direction of the planar fracture and confirming that the direction of the well is indeed aligned with the fracture plane. If an angular disagreement 107 is detected, a new direction relative to the previous one can be determined for the tangent of the well trajectory for the next drilling section and releasing the high hydraulic pressure used for hydrofracturing, allowing the new fracture and all previous fractures to close. The method can further comprise drilling to the corrected direction normal to target direction 104 to point 103, if a longer length is desired (with reference to FIG. 1); then hydrofracturing and (optionally) continuing the process to the desired depth.

The disclosed method can also include incorporating a well liner along the well if desired, the application of pressure packers or other pressure and flow control means for the trial hydrofracturing steps, and/or applying a trummy pipe and pressure packers or other techniques for the isolation of well sections.

After completing the sequential series of drilling and hydrofracturing steps over the desired length of the well, the EGS fracture system can be sequentially completed by re-opening the fractures and stabilizing the open fracture apertures all along the well starting from the farthest point and retreating to the closest point to the well head along the desired length of the series of EGS fractures. Only the completion of one EGS fracture element is described in detail, although in certain embodiments, multiple elements may be added. Proppants or a grouted island may be used for supporting an open fracture aperture, making it unnecessary to open the fracture by excessive coolant fluid pressure during energy production.

If proppants are used without adhesive settling agents, they typically are delivered starting from the bottom of well 701 under opening hydrostatic pressure of the fracture shown in FIG. 7. The proppants are pumped as a slurry through trummy pipe 703 while fracture 702 is opened to the desired aperture by hydrostatic pressure that is kept sufficiently high at least over the well section osculating the plane of the fracture being opened (FIG. 7). The aperture-opening pressure may be maintained over the entire well if desired by a pressure-holding means at the surface, or only within only a desired section of the well using pressure-insulating packers. The aperture of fracture 702 may be kept open sufficiently wider than the largest diameter of the particle size of proppants 704 by hydraulic pressure during proppant pumping in slurry (FIG. 7). The proppants 704 are pumped as a slurry through trummy pipe 703 (FIG. 7). The proppant movement in the fracture void space is helped by gravity as well as the hydrodynamic forces of the slurry flow 705 (FIG. 7). Recirculation 707 of the carrying fluid can be optionally used by backflow through the well or optionally by circulation pipe 706 (FIG. 7). The circulation pipe 706 may be perforated along its length in one solution example to promote vertical uplifting flow from circulation 707 for enhancing proppant delivery into the fracture to greater distances (FIG. 7).

Well 701 and surrounding fracture 702 filled with proppants 704 form an EGS heat exchanger unit which may easily exceed $10^6$ m$^2$ active area for heat conduction in the hot host rock connected to each side of the fracture (FIG. 7). Such a heat exchanger unit can supply several MW of continuous geothermal energy for several years without experiencing fast thermal drawdown. The completed GHE unit is a building block of an EGS power plant.

VI. Examples

Example 1

The convective coolant flow field in the planar fracture of the completed GRE is controlled by blocking the flow in the well, e.g., along a sufficiently long (such as 90 percent) well section that osculates the planar fracture by a pressure-holding packer if desired, and keeping open two short sections (e.g., 5 percent each) of the osculating well with the fracture plane for coolant fluid injection and extraction communication between the well and the fracture. If a well liner is desired to be installed, it is sufficient to block the flow in one point, e.g., at the center point of the well section. For flow communication between the well and the fracture, the liner may be punctured around the entry and exit sections of the well to the planar fracture.

Figure 8:
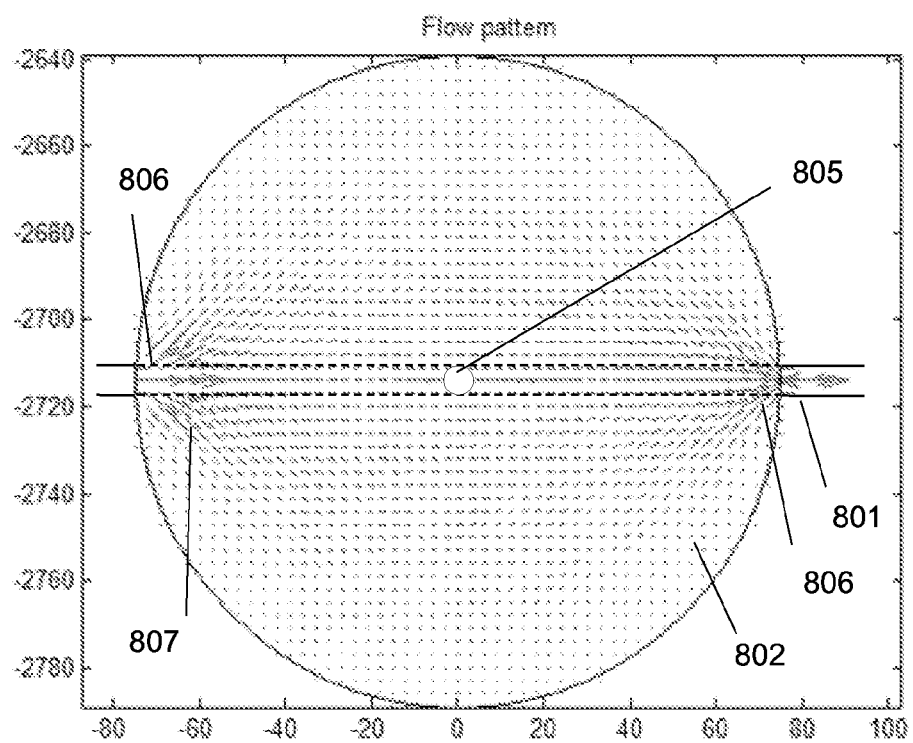
FIG. 8 is a diagram of the simulated fluid flow in an unblocked planar fracture by a grouted island, but with a blocked central well, formed according to an embodiment of the disclosed methods.

An embodiment of fracture flow communication through punched connections at the injection and extraction points between the fracture and the well is shown in FIG. 8 during coolant fluid circulation for energy extraction from the GRE from a numerical simulation example. In the embodiment illustrated by FIG. 8, the components can be as follows: 8001 is a well; 802 is a planar fracture; 805 is the center blocked point of GHE in well 801; 806 is an open section of well 801 casing; and 807 is the coolant flow field.

Example 2

Figure 9:
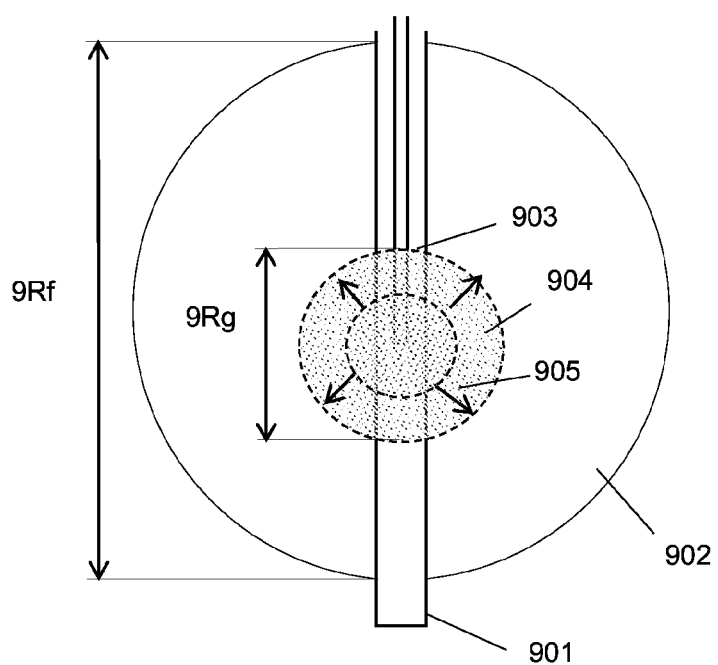
FIG. 9 is a schematic illustration of an embodiment of a planar fracture containing a grouted support island.

In embodiments wherein a grouted support island is used for keeping the fracture aperture open, such as in one exemplary system shown in FIG. 9, having the following components: 901 is a well; 902 is a planar fracture; 903 is a grouting slurry delivery trummy pipe; 904 is a grouted support island; and 905 shows the direction of slurry flow.

With reference to the embodiment shown in FIG. 9, the island is created starting from the center of the planar fracture well 901 under opening hydrostatic pressure of the fracture. The grouting slurry is either a geopolymer- or cement-contained mixture of hardening material in chemical compatibility with the rock strata and resistant to dissolution. It is pumped as an engineered slurry with the desired rheological properties, preferably with pseudo-plastic viscosity behavior if desired to fill the large aperture area close to the delivery point but to thicken fast as the flow velocity decreases with radius so it does not penetrate farther than necessary from the injection point. During grouting injection and the selected setting time period for cement or geopolymer hardening, fracture 902 is opened by hydrostatic pressure to the desired extent of the set fracture aperture (FIG. 9). If a well liner is desired to be installed, the grout injection should be made through a perforated section of the liner in the middle area of the planar fracture.

The movement of grout used to form island 904 is controlled by pumping pressure, viscous fluid friction forces, hydrodynamic forces, and gravity (FIG. 9). The shape and size of the grouted island in the middle part of the planar fracture is to be controlled with the thickness and rheological properties of the grouting slurry, as well as the control of the fluid flow rate and the duration of the injection. In an embodiment, the grouting slurry has pseudo-plastic rheological properties, for which the viscosity decreases with higher flow velocity of the slurry.

With reference to FIG. 9, a radial extension of the grouted island with its support surface of 9Rg$^2\pi$ and $\sigma_{max}$ maximum compressive strength can be designed to withstand the closing load from the rock strata, e.g., approximately 9Rg$^2$ $\sigma_{max}$>9Rf$^2$ $\sigma_N$ where 9Rf is the radius of the planar fracture and $\sigma_N$ is the in situ stress in the normal direction to the fracture plane. For example, using high-strength grout with $\sigma_{max}$=370 MPa and assuming a minimum normal stress around the EGS fracture of $\sigma_N$=37 MPa (the case at Fenton Hill, Phase I, USA), the ratio between 9Rg and 9Rf, that is, 9Rg/9Rf=$(\sigma_N/\sigma_{max})^{0.5}$=(370/37)$^{0.5}$=3.16.

While the extent of radius 9Rg should satisfy the strength requirement, the grouted island also should be large enough for blocking the preferential coolant fluid flow path in the close vicinity of the well in the axial direction. Flow field simulation studies surprisingly show that it is sufficient to block only a relatively small area, around one third of the radius in case of a circular-shaped planar fracture, 9Rg=3.16 9Rf. The use of a grouted fracture propping island made out of permanently hardening material in the central area of the planar fracture in an EGS combines at least three advantages: (1) the island keeps the planar fracture open at a near-constant aperture everywhere, without the need for applying high fluid injection pressure during energy extraction; (2) the island blocks the preferential pathways close to the shortest distances across fracture from the injection to the extraction points; and (3) it makes it easier to control the shape, volume, and height of the island using grout with fine solid particles which can be much smaller in diameter than the desired propped fracture aperture when compared to the large solid particles in the case of using solid proppant particles without the hardening component. Large fracture apertures (e.g., measured in centimeters) may be realized with a grouted, hardening island made out of fine particles (e.g., of less than 0.1 millimeter in diameter) in the central part of a planar fracture, and kept open forever at that aperture; whereas, the solid proppant particles without hardening components can only support an open aperture of less than their maximum diameter. The stabilization of the fracture aperture and decoupling it from the coolant fluid is advantageous for minimizing the movement of the rock strata during energy extraction, minimizing the creation of seismicity.

Example 3

Figure 10:
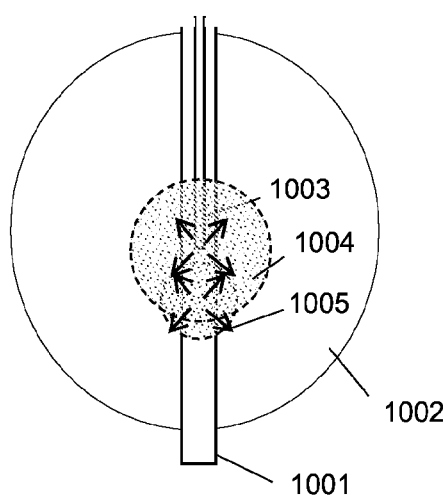
FIG. 10 is a schematic illustration of an embodiment of a method to form grouted support islands in an exemplary planar fracture.
Figure 11:
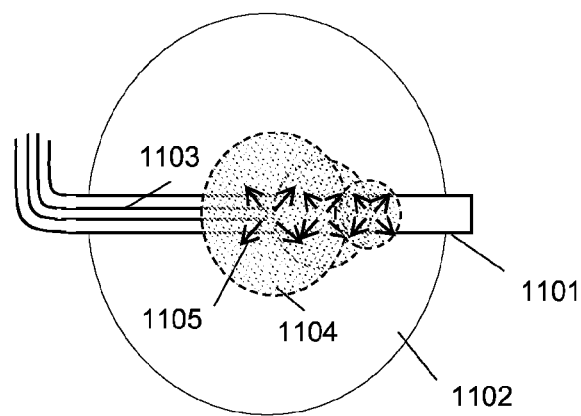
FIG. 11 is a schematic illustration of an additional embodiment of a method to form grouted support islands in an exemplary planar fracture.

Multiple grout injection points may be used with sequential grouting injections to shape the grouted island as desired, as shown in the embodiments described by FIG. 10 and FIG. 11. In the embodiment illustrated by FIG. 10, the components are as follows: 1001 is a well; 1002 is a planar fracture; 1003 is a grouting slurry delivery trummy pipe; 1004 is a grouted support island; and 1005 shows the slurry flow. In the embodiment illustrated by FIG. 11, the components are as follows: 1101 is a well; 1102 is a planar fracture; 1103 is a grouting slurry delivery trummy pipe; 1104 is a grouted support island; and 1105 shows the slurry flow.

With reference to Examples 2 and 3, the coolant fluid flow communication between a well and its osculating fracture plane during energy production from the GHE unit can be provided by the open sections of the well which are un-filled by the settling grout for injection and extraction surfaces. If a well liner is desired to be installed, it is sufficient to block the flow in one point, e.g., at the center point of the well section. For flow communication between the well and the fracture, the liner can be punctured around the entry and exit sections of the well to the planar fracture.

Example 4

Figure 12:
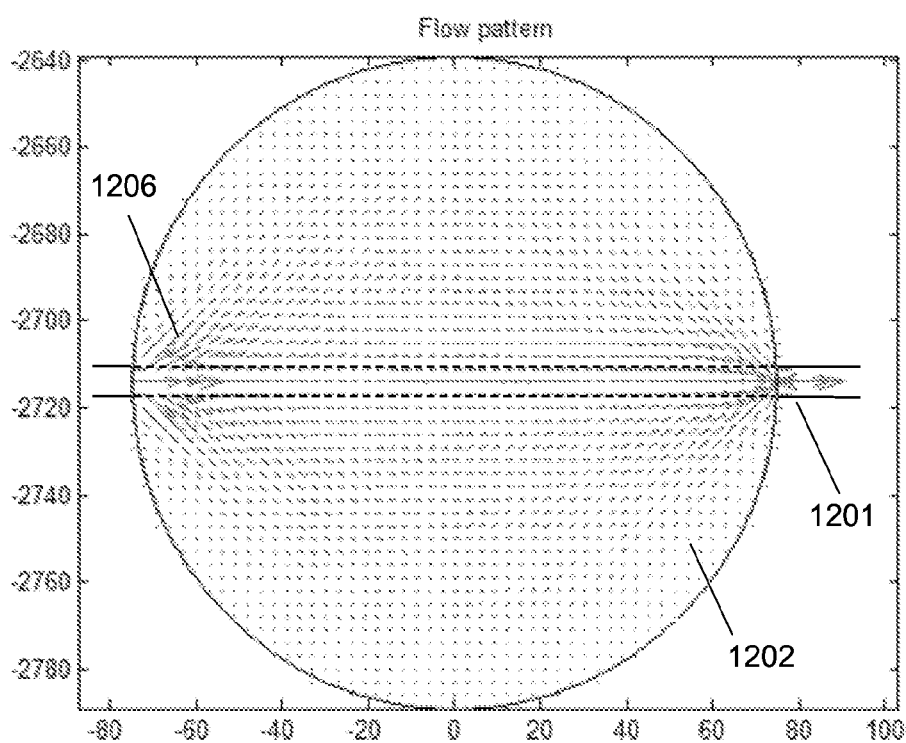
FIG. 12 is a diagram of the simulated fluid flow in an unblocked planar fracture with an unblocked central well, formed according to an embodiment of the disclosed methods.
Figure 13:
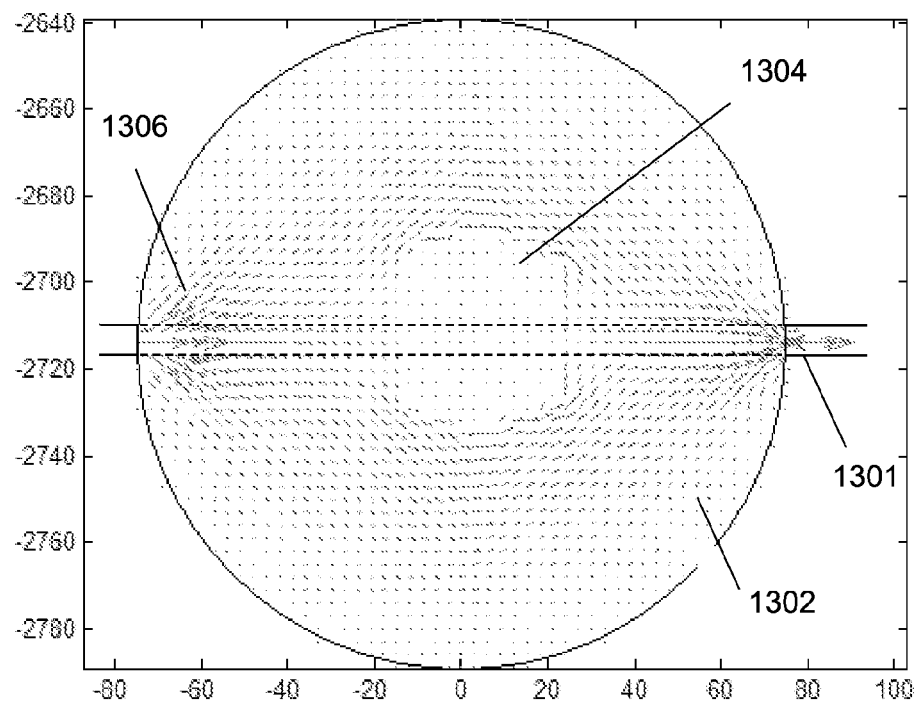
FIG. 13 is a diagram of the simulated fluid flow in a planar fracture containing a grouted support island, formed according to an embodiment of the disclosed methods.

Fluid flow simulation results are shown in FIG. 12 and FIG. 13, comparing the flow fields in an un-blocked planar fracture with a separate injection and extraction points (in FIG. 12); and in a tangentially cross-drilled, but blocked fracture with a grouted island in the center (in FIG. 13). In the embodiment illustrated by FIG. 12, the components are as follows: 1201 is a well; 1202 is a planar fracture; and 1206 shows the coolant field flow field. In the embodiment illustrated by FIG. 13, the components are as follows: 1301 is a well; 1302 is a planar fracture; 1304 is a grouted support island; and 1306 shows the coolant field flow field.

As shown, the flow field is better for the blocked fracture case as the fluid is pressed to flow to the peripheral area due to the blockage at the center (FIG. 13). In the un-blocked fracture, the fluid velocity is the highest along the easiest, preferential, straight, central direction, missing the large heat transferring area around the periphery (FIG. 12).

Example 5

Figure 14:
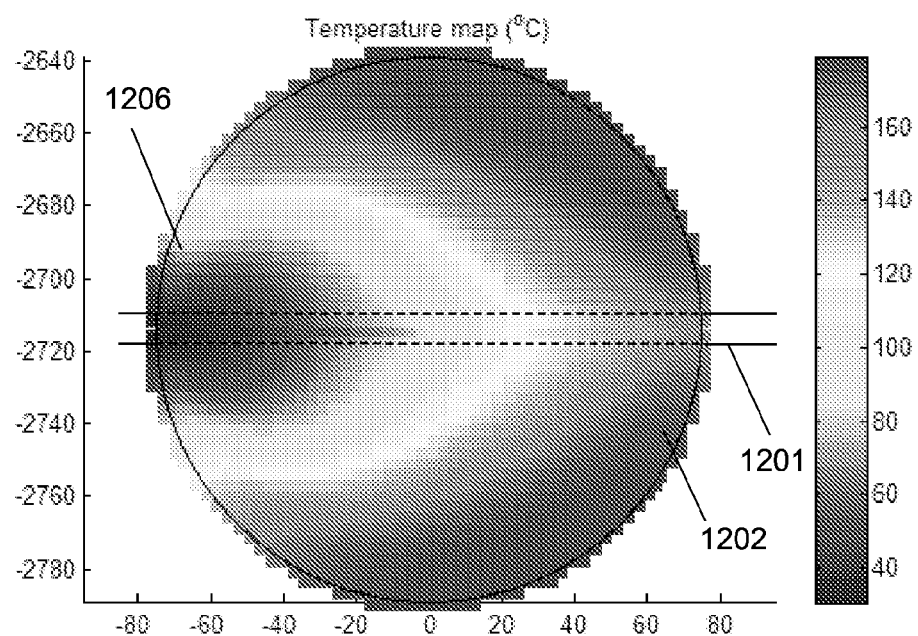
FIG. 14 is a diagram showing the simulated thermal behavior of fluid flow in an unblocked planar fracture formed according to an embodiment of the disclosed methods; the dark shading at the periphery of the illustrated circle represents hot areas of the planar fracture.
Figure 15:
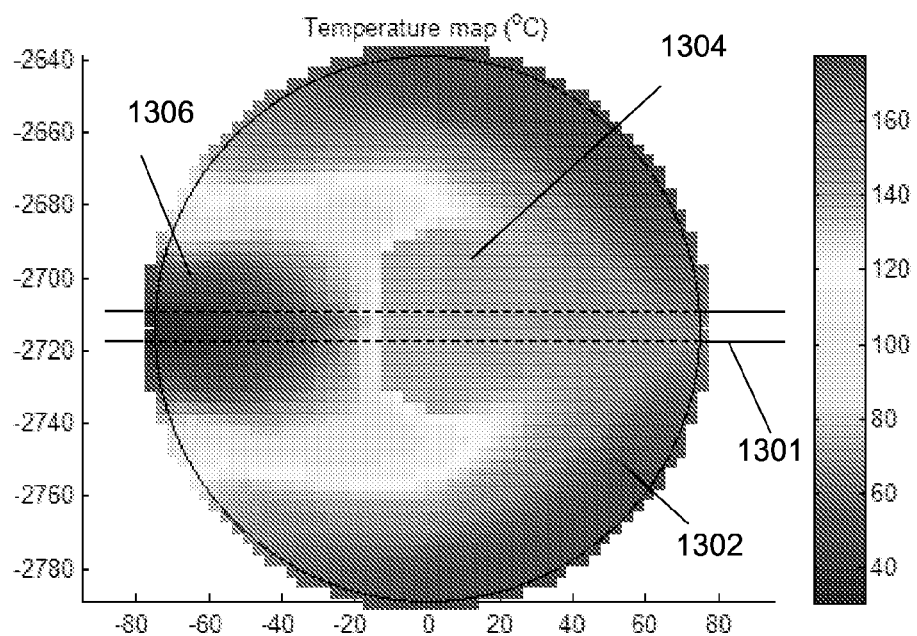
FIG. 15 is a diagram showing the simulated thermal behavior of fluid flow in a planar fracture containing a grouted support island, formed according to an embodiment of the disclosed methods; the dark shading at the periphery of the illustrated circle represents hot areas of the planar fracture.
Figure 16:
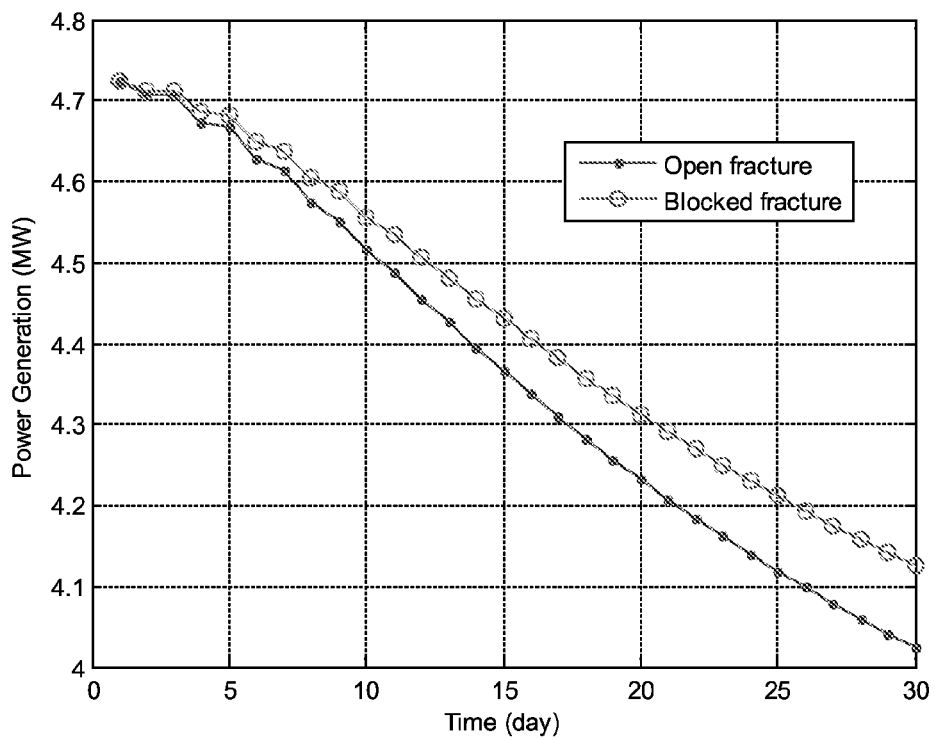
FIG. 16 is a graph of power generation (MW) as a function of time (days) showing the variation of thermal power generated over time in exemplary planar fractures formed according to embodiments of the disclosed methods.

Simulations of the performance of EGS using wells containing grouted support islands were made and are shown in FIG. 14 and FIG. 15. FIG. 14 and FIG. 15 are overlaid on the fluid flow simulation results shown in FIG. 12 and FIG. 13. The thermal performance comparison in FIG. 14 versus FIG. 15 surprisingly shows coolant fluid cools the rock strata better in the blocked fracture case in spite of a smaller active cooling contact surface of $(Rf^2-Rg^2)\pi$ than that of the unblocked fracture case where a larger active cooling contact surface of $Rf^2\pi$ is available. The thermal drawdown of the exemplary GHE system with a 150 m diameter, planar fracture, 180° C. virgin rock strata temperature and 15 kg/s coolant fluid circulation is characterized by the temporal variation of thermal power during energy extraction, plotted in FIG. 16. FIG. 16 is a graph of the power generation over time (days) of the blocked system (large circles) and the open system (small circles). As shown in the graph, the blocked fracture with a grouted support island which excludes the flow in the central area of the fracture produces higher thermal power from the rock strata, in spite of a reduced surface area relative to the un-blocked case at day 30, and the difference is increasing over time in favor of the blocked flow distribution in an EGS fracture. Without being limited to a particular theory, it is currently believed that this behavior results from the flow blockage created by the grouted island in the middle of the fracture volume, which can reduce the preferential flow passage in the central void space in the fracture, forcing the coolant fluid to flow more evenly toward the periphery, where the heat is more efficiently transferred from the rock strata to the coolant fluid.

Example 6

A wide variety of engineering methods are known for the circulation of the coolant fluid in the EGS fractures. An embodiment of a simple coolant fluid cross flow method is combined with a GHE flow system in the EGS fracture in FIG. 17, showing the following components: 1701 is a planar fracture i of a series of connected fractures in a GHE; 1702 is a central well of the GHE; 1703 is a grouted support island of fracture i; 1704 indicates the coolant fluid velocity in fracture i; 1705 is the trajectory section of central well 1702 in the osculating plane of planar fracture i; 1706 is a flow blockage in fracture i (necessary in a lined well); 1707 is a connection for coolant fluid injection; and 1708 is a connection for heated fluid extraction.

Figure 17:
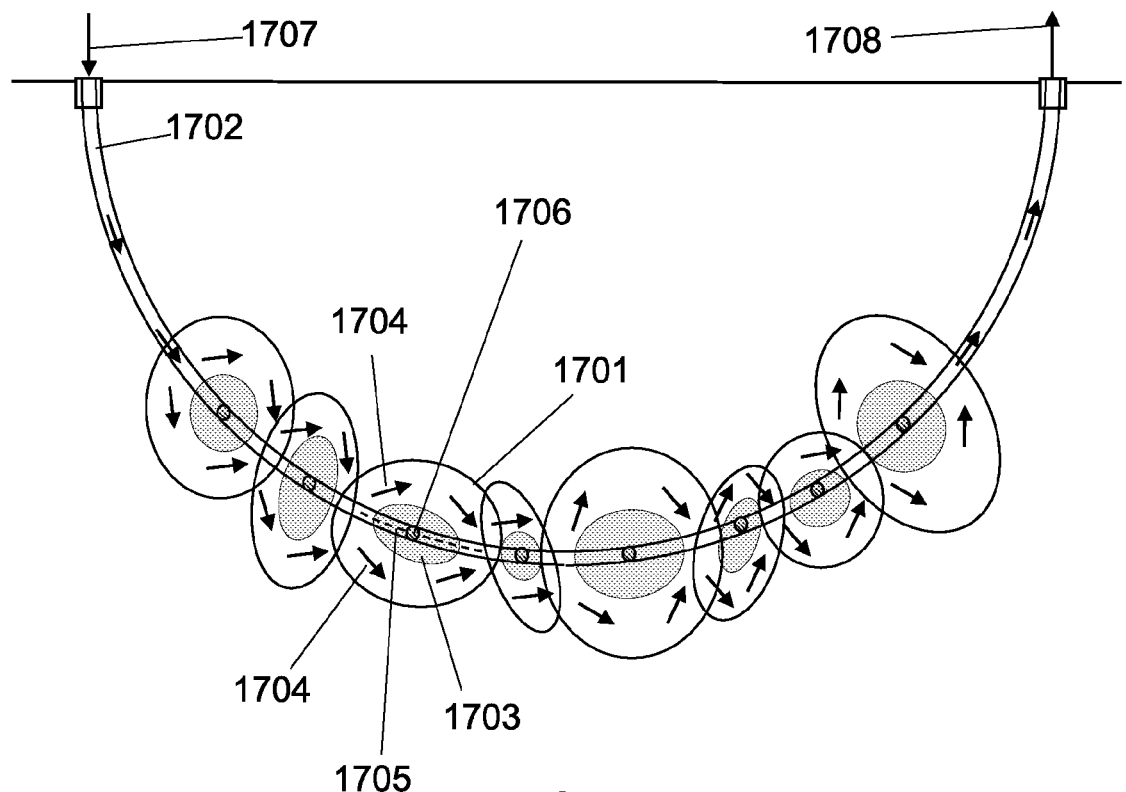
FIG. 17 is an illustration of an exemplary engineered geothermal system using a horizontal single well containing a series of connected planar fractures containing grouted support islands, formed according to embodiments of the disclosed methods.

In the embodiment shown, a single, directionally drilled central well 1702 is used, with the drilling direction following the method, aligning the tangent of the well's trajectory with the osculating plane of each fracture element at its center area 1705 (FIG. 17). Grouted and/or propped islands may be employed in each EGS fracture element completed in either a lined or an unlined, free well. If the well is unlined, the grouted support islands 1703 may serve as flow blockages along the well and flow diversions to force the coolant fluid into the peripheral area over the fracture surface in each of the eight units depicted (FIG. 17).

The flow field 1704 in the $i^{th}$ unit as well as in the entire exemplified EGS are also illustrated. Due to the large open aperture in the EGS fractures, the cross flow can be maintained with low pressure loss and low injection pressure from injection point 1707 to extraction point 1708. Assuming 150 m diameter circular, planar, lens-shape fractures with a 0.01 m (10 millimeter) fracture aperture at each fracture center (and tapering it to zero at the edge), each unit will require 0.1 bar or less pressure difference at a 15 kg/s water mass flow rate from numerical simulation shown in FIG. 15. Thus, the eight EGS fractures aligned in series in the arrangement of FIG. 17 require less than 1 bar driving pressure for energy extraction. This low pressure requirement is due to the large EGS fracture aperture that in turn is made possible by the disclosed fracture development and delivery method of fracture proppant and/or grouted islands. The coolant fluid efficiently contacts a large heat transport surface area, avoiding preferential, short-circuit pathways due to the new flow system in the GRE units. The injected fluid cools the rock strata by direct heat convection on the fractured rock surface, coupled to heat conduction in the rock strata. Assuming 8 fractures ideally spaced along a single well, the starting thermal power extracted from a rock strata, similar to that of Fenton Hill, U.S., gives 8*4.7=37.6 MW according to numerical simulation.

Example 7

Figure 18:
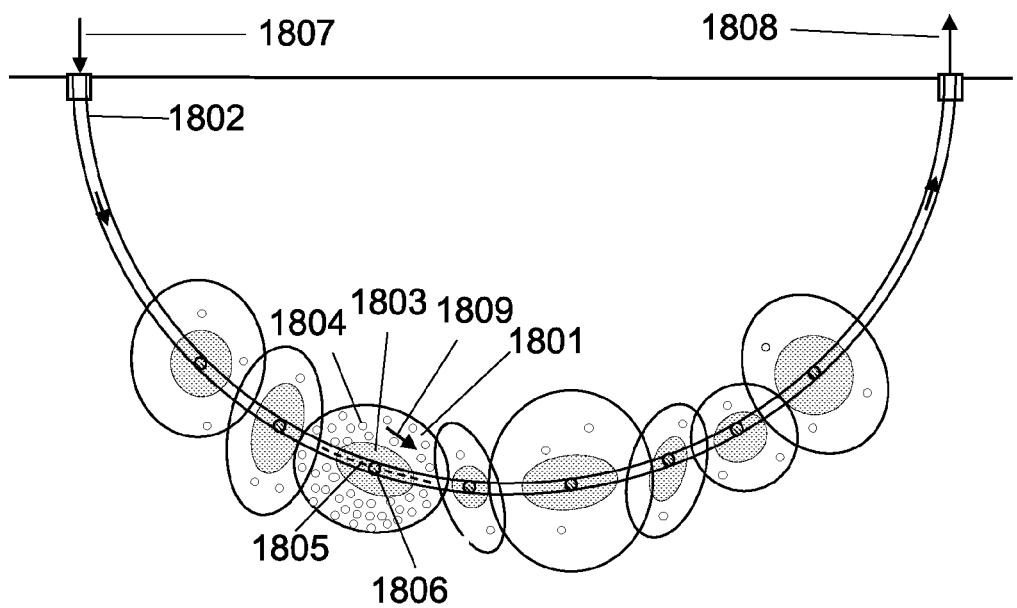
FIG. 18 is an illustration of an exemplary engineered geothermal system using a horizontal single well containing a series of connected planar fractures containing proppants in addition to grouted support islands, formed according to embodiments of the disclosed methods.

Another exemplary solution is disclosed with the inventive GHE flow system in the EGS fracture in FIG. 18, using a proppant included in the grouted island. The embodiment shown in FIG. 18 has the following components: 1801 is a planar fracture i of a series of connected fractures in a GHE; 1802 is a central well of the GHE; 1803 is a grouted propping island of fracture i; 1804 shows the proppants in fracture i; 1805 is the trajectory section of central well 1802 in an osculating plane of planar fracture i; 1806 is a flow blockage in fracture i (necessary in a lined well); 1807 is a connection for coolant fluid injection; and 1808 is a connection for heated fluid extraction.

In the embodiment shown, a single, directionally drilled central well 1802 is used again, completed with a well liner (FIG. 18). Furthermore, proppants as well as grouted fracture aperture support are applied in each EGS fracture i in series along well 1802. The proppant delivery and the grouted fracture aperture support are both completed through the punched well liner using the step-by-step procedures disclosed herein. The well liner is flushed clean from the cemented grout before further opening perforations are completed over the un-grouted sections between the support islands. A person of ordinary skill in the art, armed with the benefit of the present disclosure, can deviate from the example regarding leaving out the liner in the EGS fracture zone to avoid the cost and complexity of dealing with the liner, and instead, using a free well but sectional isolations with packers and a trummy pipe for sequential proppant delivery first, followed by grouting injection. Grout injection in a pressurized well section for fracture opening for the desired aperture, and keeping the opening pressure on until the grout is hardened, are favored for a propped fracture completion. Grout elimination from the well is a step that may require well cleaning by re-drilling for the exemplary solution. The coolant fluid circulation in well 1802 is forced through the void space of the planar fractures left open between the proppants by the blockages 1806 in the center of each fracture (FIG. 18). The blockage may be inserted as a permanent, pressure-bearing packer at the end of the GHE completion, or as part of the grouting left in well 1802 during retreating construction. The injection point 1807 and extraction point 1808 are connected to well 1802.

Example 8

Figure 19:
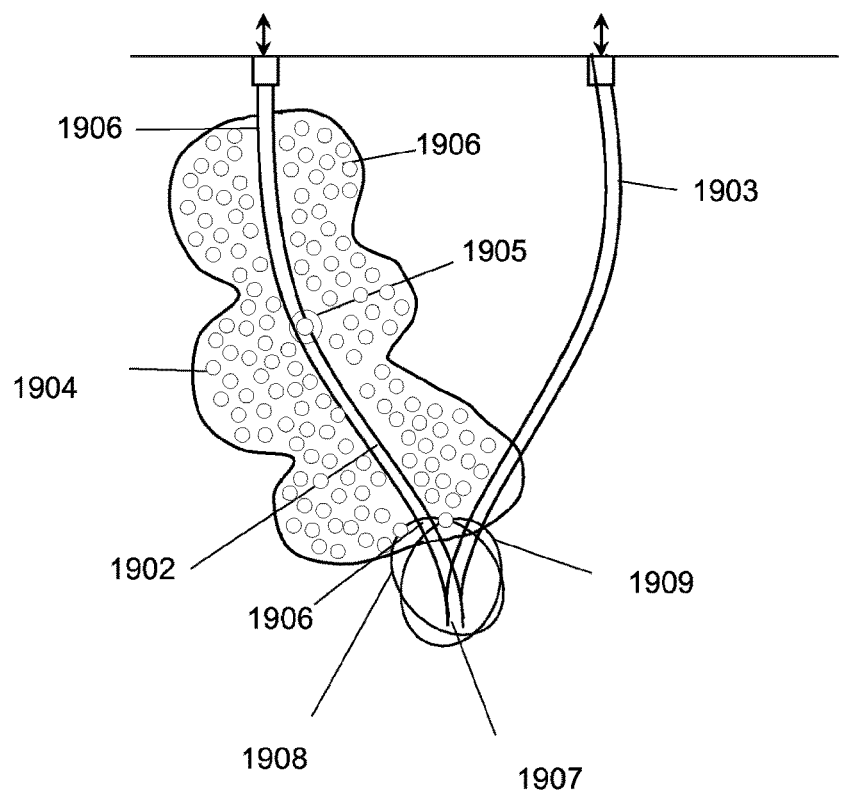
FIG. 19 is an illustration of an engineered geothermal system using a single heat production well containing proppants, formed according to embodiments of the disclosed methods.

FIG. 19 is an exemplary application of the new GHE unit using one heat production well. The embodiment shown in FIG. 19 can include the following components: 1901 is a GHE unit; 1902 is a central well of the GHE; 1903 is a fluid circulation well; 1904 shows proppants; 1905 shows the center blocked point of the GHE in well 1902; 1906 is the open section of well 1902 casing; 1907 is the lowest bottom point for a well connection between fractures 1908 and 1909; 1908 is a hydrofracture (DOMNPP) from well 1902 for a well connection; and 1909 is a hydrofracture (DOMNPP) from well 1903 for a well connection.

In the GHE unit embodiment shown in FIG. 19, central well 1902 to the EGS fracture or series of overlaying fractures 1901 completed with proppant particles is blocked at center point 1905 to force the fluid to flow through the void space of the fracture. The casing of well 1902 is punched open over the entry and the exit sections of the well that enter and leave (overlap) the osculating fracture plane at only these sections. The fracture is kept open by proppants, as shown in FIG. 19.

Fluid circulation well 1903 is directionally drilled to intersect central well 1902 of GHE 1901 at one point (FIG. 19). In an embodiment, shown in both FIG. 19 and FIG. 20, it is at the lowest bottom point 1907 of the EGS system. In an embodiment for connecting two wells for coolant fluid circulation, also shown in both FIG. 19 and FIG. 20, dual, near-parallel hydrofractures can be used.

With reference to FIG. 19, hydrofracture 1908 is created first from well 1902 for connection with the bottom of well 1903. Fluid circulation well 1903 is drilled toward bottom point 1907 within fracture 1908, preferably intersecting well 1902, but realistically, may be bypassing it within a short distance, e.g., a few meters considering current drilling technology. To establish flow connection, if necessary due to missed wells intersection, another, planar fracture 1909 is created from well 1903, expected to be near parallel with fracture 1908 (FIG. 19). Thermal fracture enhancement between fractures 1908 and 1909 may be performed by coolant fluid circulation within fractures 1908 and 1909 independently through wells 1902 and 1903 using internal, pipe-in-pipe flow loops for rock strata cooling. Thermal contraction and the formation of secondary fractures normal to the planes of fractures 1908 and 1909 during the first set of thermal enhancement will establish flow connection between the parallel fractures as they are created within the thermal penetration depths of the temperature field around them. Second, cross-flow between well 1902 and 1903 can be created to further enhance the flow connection with low circulation resistance. Therefore, wells 1902 and 1903 will become connected for cross-flow circulation of the EGS fracture system (FIG. 19).

Figure 20:
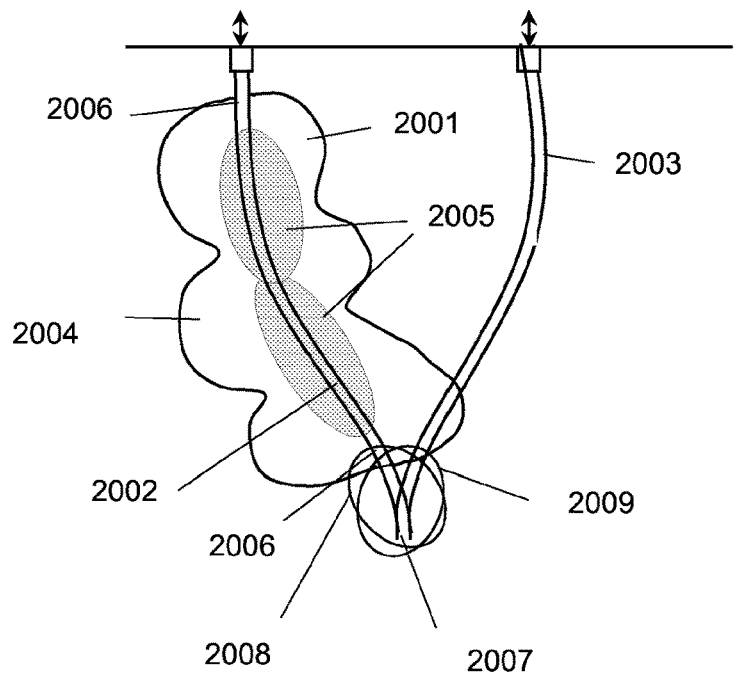
FIG. 20 is an illustration of an additional engineered geothermal system using a single heat production well containing grouted support islands, formed according to embodiments of the disclosed methods.

FIG. 20 shows an additional embodiment of a GHE unit using one heat production well. The embodiment shown in FIG. 20 can have the following components: 2001 is a GHE unit; 2002 is a central well of the GHE; 2003 is a fluid circulation well; 2004 shows proppants; 2005 shows the center blocked point of the GHE in well 2002; 2006 is the open section of well 2002 casing; 2007 is the lowest bottom point for a well connection between fractures 2008 and 2009; 2008 is a hydrofracture (DOMNPP) from well 2002 for a well connection; and 2009 is a hydrofracture (DOMNPP) from well 2003 for a well connection.

In the embodiment shown in FIG. 20, the fracture aperture is stabilized by a grouted support island at least around point 2005, with a dual function of stabilizing the open fracture aperture and to block the flow in the preferential flow channel areas close to well 2002. The coolant fluid may be circulated in either direction within the GHE as desired to obtain optimum power output. In certain embodiments of an energy system for connecting wells 2002 and 2003, shown in both FIG. 19 and FIG. 20, the fluid circulation well is drilled far apart from the central well of the GHE to minimize parasitic heat exchange between the injection and extraction fluids, reducing entropy increases.

Figure 21:
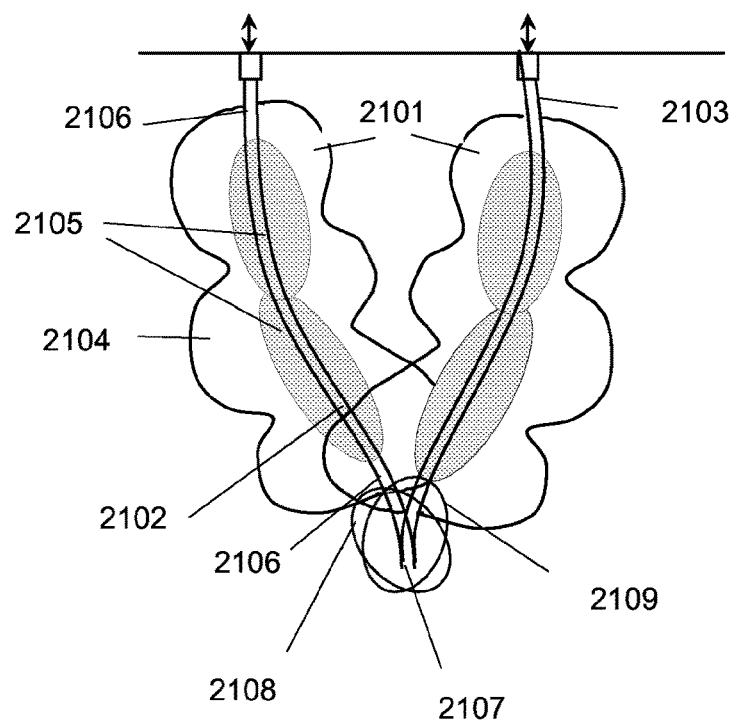
FIG. 21 is an illustration of an engineered geothermal system using two heat production wells containing grouted support islands, formed according to embodiments of the disclosed methods.

An additional exemplary embodiment is shown in FIG. 21 with two wells, both developed with their GHE units to double the thermal energy capacity. The embodiment shown in FIG. 21 can have the following components: 2101 are GHE units; 2102 is a central well of the first GHE; 2103 is a central well of the second GHE; 2104 is an open fracture void space; 2105 show grouted support and flow-blocking islands; 2106 is the open section of well 2102 casing (if casing is desired); 2107 is the lowest bottom point for a well connection between fractures 2108 and 2109; 2108 is a hydrofracture (DOMNPP) from well 2102 for a well connection; and 2109 is a hydrofracture (DOMNPP) from well 1003 for a well connection.

Example 9

Figure 22:
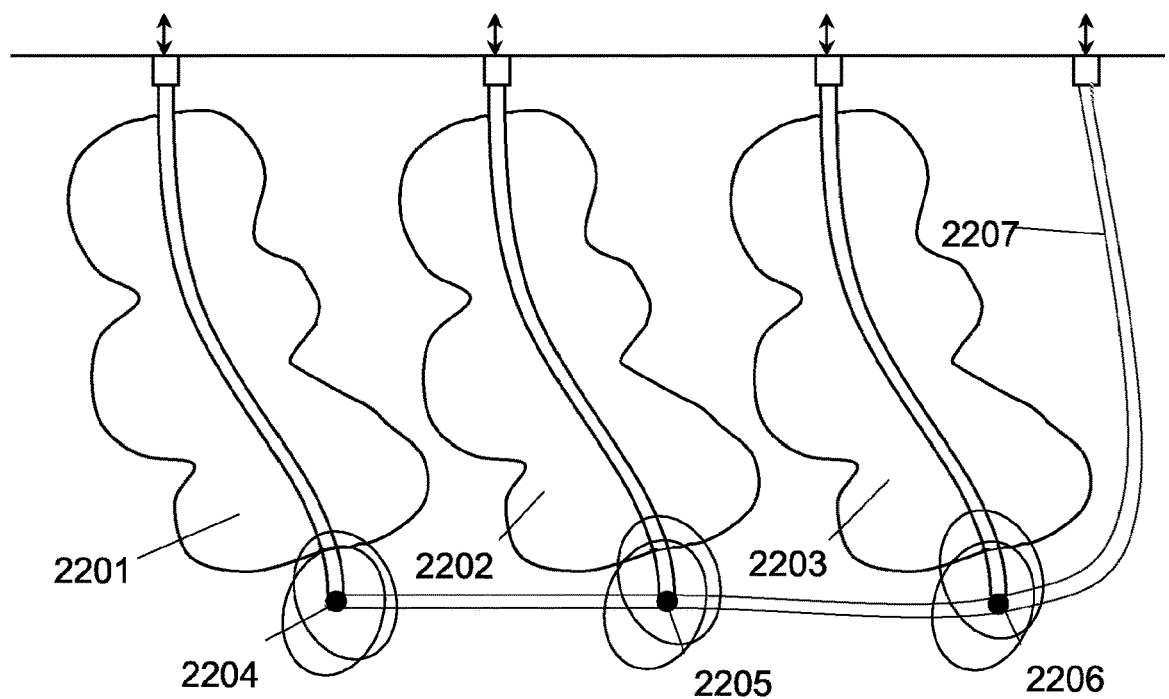
FIG. 22 is an illustration of an engineered geothermal system made with a series of geothermal heat exchanging units and a common recirculation well, formed according to embodiments of the disclosed methods.

A further exemplary embodiment of GHE units for a geothermal energy system is shown in FIG. 22. The embodiment shown in FIG. 22 can have the following components: 2201, 2202 and 2203 are GHE units; 2204, 2205 and 2206 are well connections (DOMNPP); and 2207 is a common circulation well. In this embodiment, a series of GHE units 2201, 2202, and 2203 are connected by intersections 2204, 2205 and 2206 to a common recirculation well 2207.

Example 10

Figure 23:
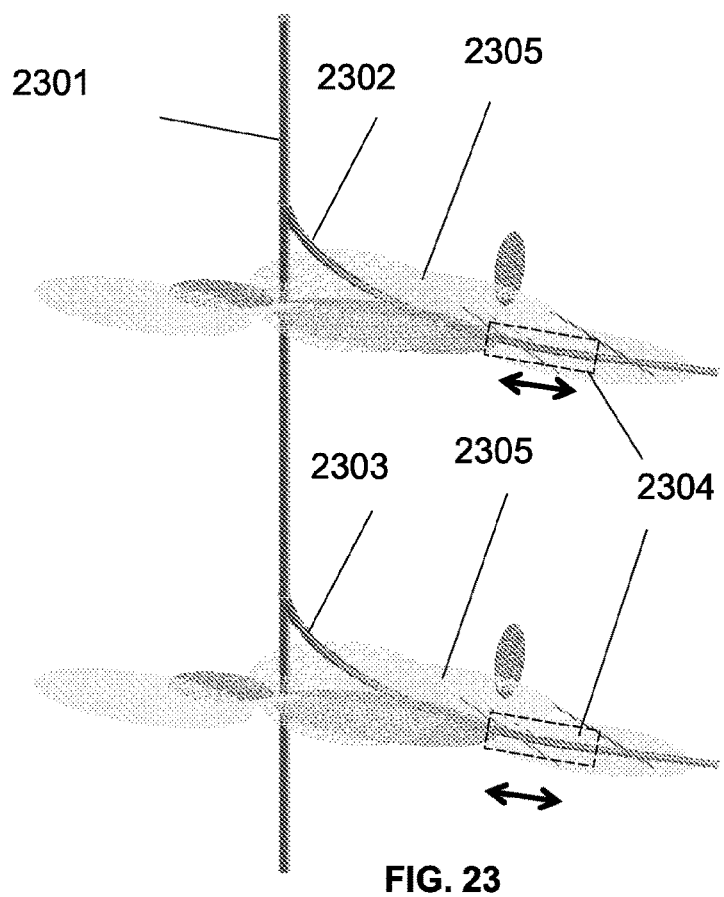
FIG. 23 is a schematic illustration of an engineered geothermal system made with a series of geothermal heat exchanging units connected to a central well, formed according to embodiments of the disclosed methods.

Another exemplary embodiment of GHE units for a geothermal energy system is shown in FIG. 23. The embodiment shown in FIG. 23 can have the following components: 2301 is a main well; 2302 is a directionally drilled central GHE well at a first geologic level; 2303 is a directionally drilled central GHE well at a second geologic level; 2304 is a moving fracturing and testing device for hydrofracturing and completion of the EGS fractures with proppants or grouting support islands along central wells 2302 and 2303; and 2305 are the FROG fractures.

In this embodiment, FIG. 23 shows a horizontal central well 2302 with multiple circular, planar fractures 2305 with grouted propping islands for fracture aperture stabilization as well as flow direction control in the fracture planes. In certain embodiments, GHE units 2305 are connected through directionally drilled wells 2302 and 2303 to main well 2301. This arrangement assumes that at least the first planar fracture of fracture elements 2305 are created from main well 2301 as a test fracture for the assessment of the in situ fracturing direction and the in situ stress field. It is further assumed that the microseismic clouds are recorded during the test hydrofracturing. The arrangement further assumes that side-branch wells 2302 and 2303 are directionally drilled following the known location of the pre-recorded microseismic clouds during drilling to intersect the first few tryout fractures at as many points as possible. From this point, optimal selection of the first, second, and third connection points from the set of intersection points can be performed, if desired, by in situ testing, such as by using a testing device. The planar fractures can be completed with grouted support islands created at the third connection point in each planar fracture component, and further improvements can be made for neighbor flow connectivity by thermal enhancement with coolant fluid circulation, as described herein.

The fracturing and testing device 2304 is shown as it is moved for testing the FROG fracture elements 2305 and enhancing their connectivity to each other and to well 2302 and 2303 for completing them. In this example, the GHE has a single fluid connection, requiring a huff-puff-type coolant fluid delivery system.

Example 11

Figure 24:
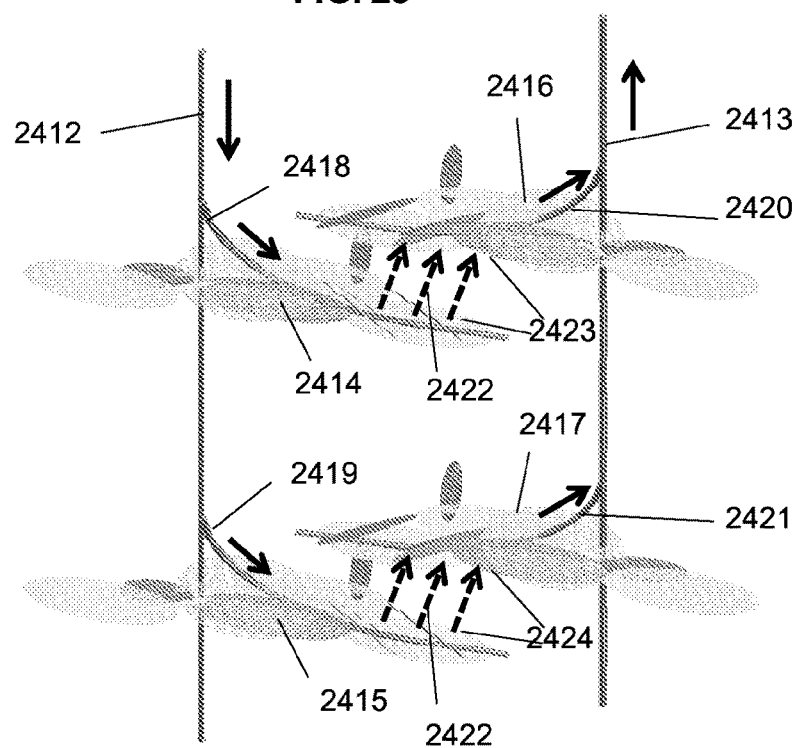
FIG. 24 is a schematic illustration of an engineered geothermal system made with a series of geothermal heat exchanging units connected via a cross-circulated reservoir, formed according to embodiments of the disclosed methods.

An additional embodiment of GHE units for a geothermal energy system is shown in FIG. 24. The embodiment shown in FIG. 24 can have the following components: 2412 is a first main well 1; 2413 is a second main well 2; 2414 is GHE 1; 2415 is GHE 2; 2416 is GHE 3; 2417 is GHE 4; 2418 is a directionally drilled central GHE well 1 at a first geologic level; 2419 is a directionally drilled central GHE well 2 at a second geologic level; 2420 is a directionally drilled central GHE well 3 at the first geologic level; 2421 is a directionally drilled central GHE well 4 at the second geologic level; 2422 shows the coolant fluid flow in secondary fractures created by thermal enhancement; 2423 are the hydrofractures (DOMNPP) at the first geographic level; and 2424 are the hydrofractures (DOMNPP) at the second geographic level.

In the embodiment shown in FIG. 24, two GHE units each of which may be completed according to the example shown in FIG. 23, are used for operation in a cross-circulated EGS reservoir. Main well 2412 is branched out to GHE units 2414 and 2415 through wells 2418 and 2419 to supply coolant fluid at the first and second levels, respectively. Likewise, main well 2413 is branched out to GHE units 2416 and 2417 through wells 2420 and 2421 to collect heated fluid at the first and second levels, respectively (FIG. 24). Coolant fluid flow crossing 2422 from the injection GHE units 2414 and 2415 into the extraction GHE units 2416 and 2417 in the short distance in the rock strata is shown through secondary fractures. The secondary fractures may be created, to enhance at least parts of the GHE units as DOMNPP fractures 2424. In case of a failure to achieve adequate circulation in a particular GHE unit in the entire EGS system, prolonged thermal enhancement may be used for mitigation.

Example 12

Periodic, or two-phase huff-puff circulation, can be incorporated, if desired, in any of the exemplary embodiments described herein. For example, in case of failure to achieve adequate circulation in a GHE unit, two-phase huff-puff circulation can be accomplished. A two-phase alternating huff-puff circulation between two sets of EGS fractures can be used, and is shown in embodiments of the geothermal energy systems shown in FIGS. 25-29, described in detail below. In these embodiments, EGS fractures from a first fracture system, such as shown in FIG. 22 as 2101, may be a GHE unit. Likewise, the EGS fracture from a second fracture system, such as 2202 in FIG. 22, may also be a GHE unit. These fractures may be connected to alternating coolant fluid delivery wells at their middle points, or at their bottom connecting points such as at 2107 in FIG. 21, if desired, which is the lowest bottom point for a well connection between two fractures 2108 and 2109.

Figure 25:
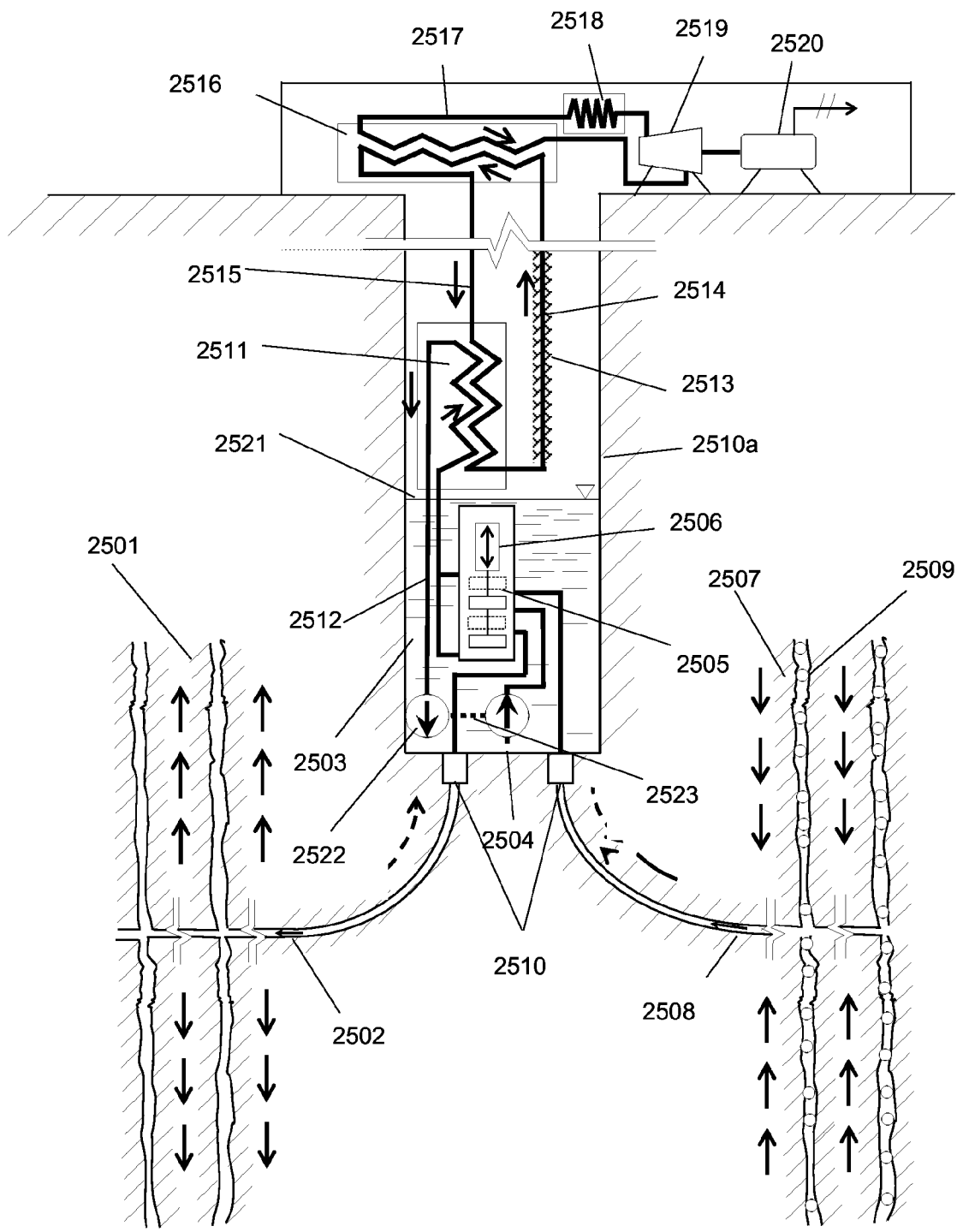
FIG. 25 is a schematic illustration of an engineered geothermal system using two-phase alternating circulation between the two sets of fractures, formed according to embodiments of the disclosed methods.

The embodiments shown in FIGS. 25-29 contain a number of the following common components, wherein the common components are described below using third and fourth digit of the components shown in their corresponding figure. For example, common component "01," is shown in FIG. 25 as component 2501, FIG. 26 as component 2601, FIG. 27 as component 2701, FIG. 28 as component 2801, and in FIG. 29 as component 2901. Similarly, common component "02" is shown in FIG. 25 as component 2502, FIG. 26 as component 2602, FIG. 27 as component 2702, FIG. 28 as component 2802, and in FIG. 29 as component 2902, and so on. The common components are: "01" is an EGS fracture from a first fracture system under compression, condensing the residual steam; "02" is coolant fluid being pumped from a cooled reservoir; "03" is a cooled reservoir; "04" is a pump; "05" is a four-way valve in the position of filling a first fracture system and discharging a second fracture system; "06" is a reversal actuator to the four-way valve; "07" is an EGS fracture from a second fracture system under discharge, carrying the two-phase heated coolant fluid to the downhole heat exchanger; "08" is a heated, two-phase coolant fluid discharged due to flashing from EGS fracture "07" and delivered to a downhole heat exchanger; "09" is steam bubbles; "10" shows well connections to pipelines "10a"; "10a" is a central connection well; "11" is a downhole heat exchanger; "12" is a cooled and condenser return pipe from "11"; "13" is a hot leg of the coolant loop to surface; "14" shows thermal insulation of a hot leg; "15" is a cold leg of the coolant loop to downhole leg hot exchanger; "16" is a surface heat exchanger; "17" shows binary two-phase circulation; "18" is a condenser; "19" is a turbine; "20" is an electrical generator; "21" is the cold coolant fluid level; "22" is a recovery turbine; "23" is a turbine to pump coupling; "24" is a pump; "25" is a sealing plug for GHE 1; "26" is a sealing plug for GHE 7; "27" is the center level of coolant in fracture 1; "28" is the highest level of coolant in fracture 1; "29" is the lowest level of coolant in fracture 1; "30" is the center level of coolant in fracture 7; "31" is the highest level of coolant in fracture 7; "32" is the lowest level of coolant in fracture 7; "33" is an alternating pendulum of coolant; "34" shows recirculation; "35" is a bleeding connection to fracture 1; "36" is a bleeding connection to fracture 2; "37" is a modulator reservoir; "38" is a controlled submergible pump for connecting recirculation; "39" is a controlled submergible pump for alternating pendulum motion modulation; "40" is a surface heat exchanger; and "41" is a heat extract to power plant.

In some embodiments, fluid within the first and/or second fracture systems is periodically evaporated in order to increase the active surface area of the first or second fracture systems. In an example, evaporation is achieved by lowering the pressure of the first or second fracture systems below the saturated or dissolution pressure limit of the coolant fluid. When the pressure is suitably lowered, a phase change is induced and liquid phase coolant is purged from fractures by the gas phase in one cycle. The pressure can then be raised, or allowed to rise, above the saturated or dissolution limit to deliver liquid phase coolant to the fractures in another cycle. Liquid phase and gas phase cycles are alternated, in one embodiment, in order to increase heat extraction, such as by contacting a greater surface area of the fracture system. Between cycles, a vigorous fluid flow field and latent heat exchange, in addition to sensible heat exchange, is created between the coolant fluid and the fracture system (rock). The implementation can be used to promote delivery of coolant fluid to stagnant, hard to reach fracture areas.

These systems and methods may advance energy extraction by using the two-phase huff-puff cooling system according to the disclosure of U.S. Pat. No. 8,430,166, which is hereby incorporated by reference in its entirety. These methods allow for increasing the efficiency of the EGS system by means of a pressure control system that allows for a tandem, synchronized operation of a two-phase cooling system.

An embodiment of a pressure control system is explained with reference to FIG. 25. It is assumed that the alternating, two-phase huff-puff cooling system is in continuous operation, and as shown, the first fracture system 2501 is filled with gaseous steam at this phase. In some examples, the system includes EGS fractures from the first fracture system 2501 shown now under compression, being filled with the help of pump 2504 through 4-way valve 2505 with coolant fluid which condenses the residual steam. Pumping liquid from cooled reservoir 2503 into the first fracture system increases pressure in the void space, condenses the residual steam and allows the flow of liquid to fill its entire volume with coolant fluid. EGS fractures from the second fracture system 2507 is also shown as the heated, two-phase coolant fluid is being discharged due to flashing and channeled to downhole heat exchanger 2511 through pipes and 4-way valve 2505. Heat exchanger 2511 is cooled from the surface through a loop with cold leg 2515 and hot leg 2513, which delivers the geothermal energy to the stem cycle of turbine 2519 which drives electrical generator 2520. Reversal actuator 2506 is set to lower position, moving the spool of 4-way valve 2505 to lower position (shown) and connecting pump 2504 to the first fracture system 2501. The solution shown is compromised, running the cold leg 2515 and hot leg 2513 together in one central well 2510a. Heat insulation of the hot leg of the pipe section 2514 within central well 2510a may be used to reduce parasitic heat exchange with cold leg 2515.

At least one, but not the only, novel element of the process is that as the liquid coolant fluid is pumped out, the coolant fluid level 2521 in the cooled reservoir decreases, dropping its hydrostatic pressure (FIG. 25). This lowered pressure is by design set to be crossing the boiling (flash) point of the coolant fluid in the second fracture system, therefore, it starts evaporating, forming bubbles 2509 and purging out its fluid volume from the fractures. The fluid from the second fracture system 2507 through well 2508 and 4-way valve 2505 enters downhole heat exchanger 2511 and condenses, flowing back to cooled reservoir 2503 (FIG. 25). On its way, its kinetic energy is recovered through recovery turbine 2522 and fed back to assist pump 2504, reducing pumping power input and increasing energy efficiency. Hypothetically, therefore, only the friction loss is supplied by electrical energy to the alternating tandem two-phase cooling system.

Once the first fracture system 2501 is completely filled with condensed coolant fluid and the second fracture system 2507 is emptied of liquid phase and filled with steam, the process is reversed via reversal actuator 2505 which moves the spool of the 4-way valve to the upper position (FIG. 25). In this reversal phase, the fluid is then pumped into the second fracture system 2507 from fracture system 2501 and the reversed process is repeated symmetrically to the previous one. Downhole heat exchanger 2511 receives geothermal energy alternately from the right side to the left side and so on while its hot leg 2513 continuously supplies the power generator 2520 with thermal energy (FIG. 25).

Figure 26:
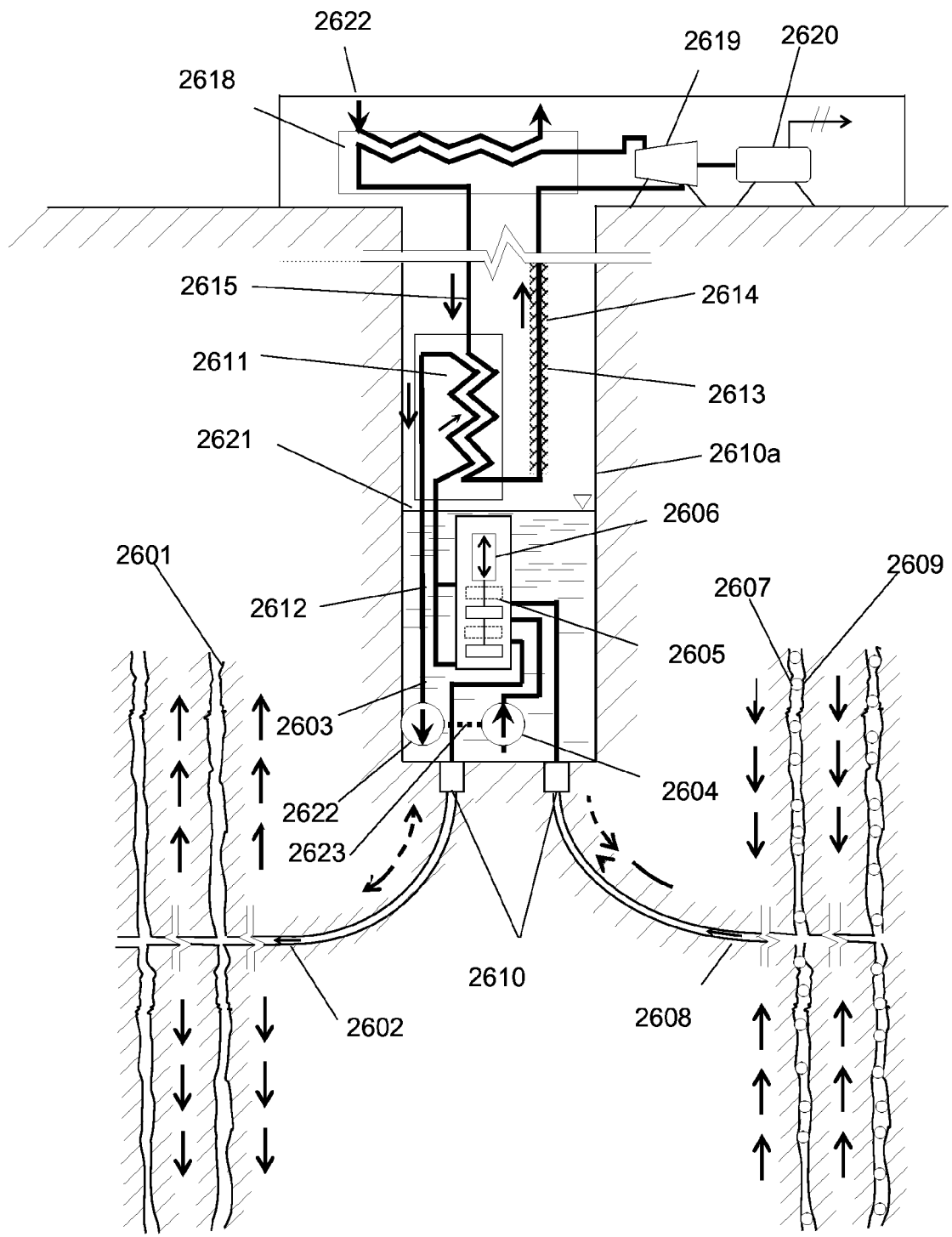
FIG. 26 is a simplified schematic illustration of the engineered geothermal system of FIG. 25.

Another variation of the system according to FIG. 25 is shown in FIG. 26. Only the turbine steam cycle and the downhole heat exchanger are changed. The exemplary system in FIG. 26 employs a two-phase downhole cooling system in which the cold leg 2615 is condensate from turbine 2619 and the hot leg 2613 is already steam, protected from parasitic heat exchange with cold leg 2615 by thermal insulator 2614.

Figure 27:
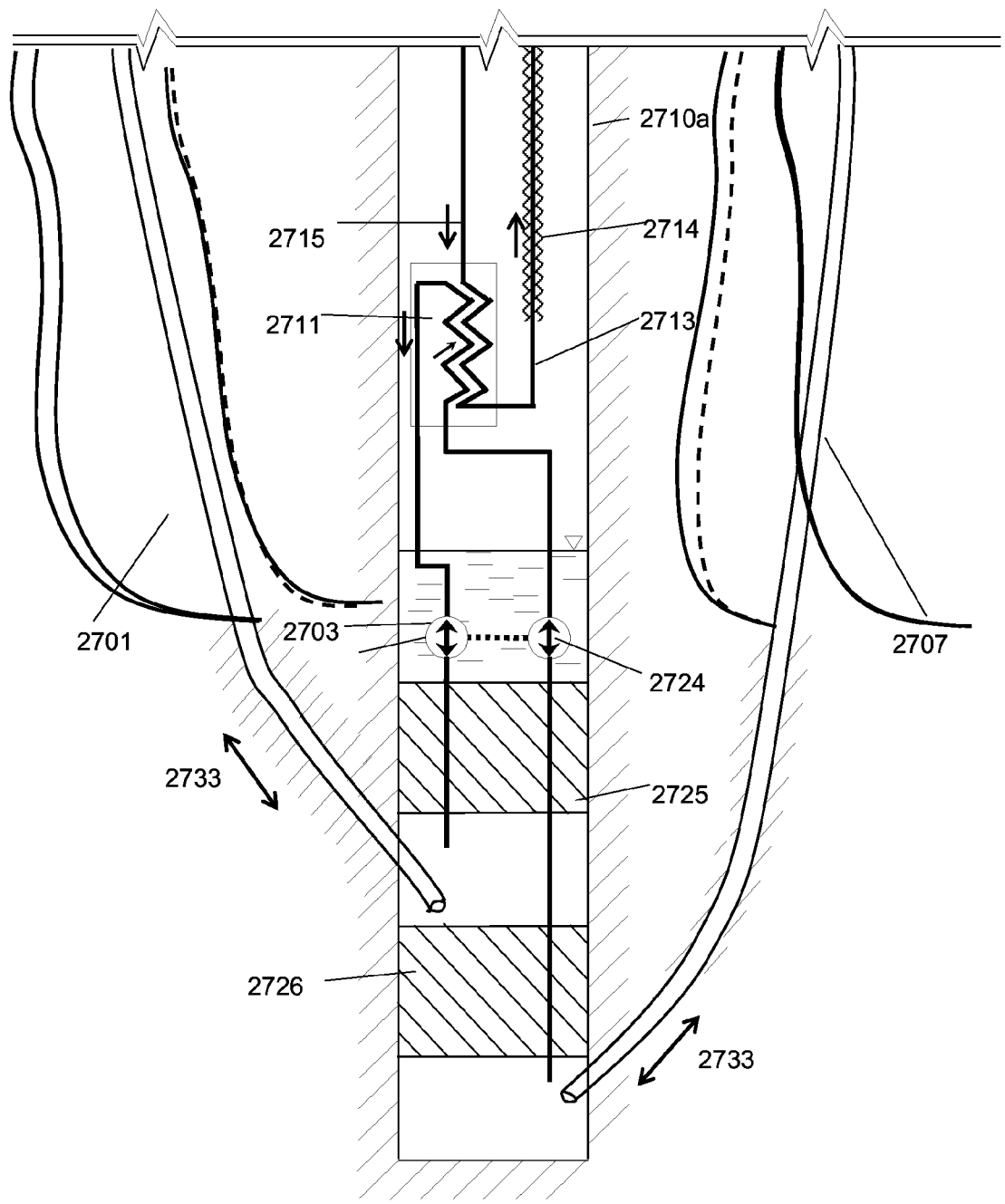
FIG. 27 is a schematic illustration of an engineered geothermal system having a coupled fracture system and a separate fluid connection well, formed according to embodiments of the disclosed methods.

FIG. 27 shows a system that couples fracture system 2701 and system 2707 together with a fluid connecting well 2710a. Fracture system 2701 is connected to pump 2704 and fracture system 2707 is connected to pump 2724. Sealing plugs 2725 and 2726 provide flow connection between the fracture systems and heat exchanger 2711 (FIG. 27). Pump 2704 and 2724 can be individually operated to induce continuous, pulsating flow from one fracture system to the other through heat exchanger 2711 from which thermal energy is transported to the surface. Pumps 2704 and 2724 are coupled together for kinetic energy recovery during alternating, pendulum-type fluid motion if desired (FIG. 27).

Figure 28:
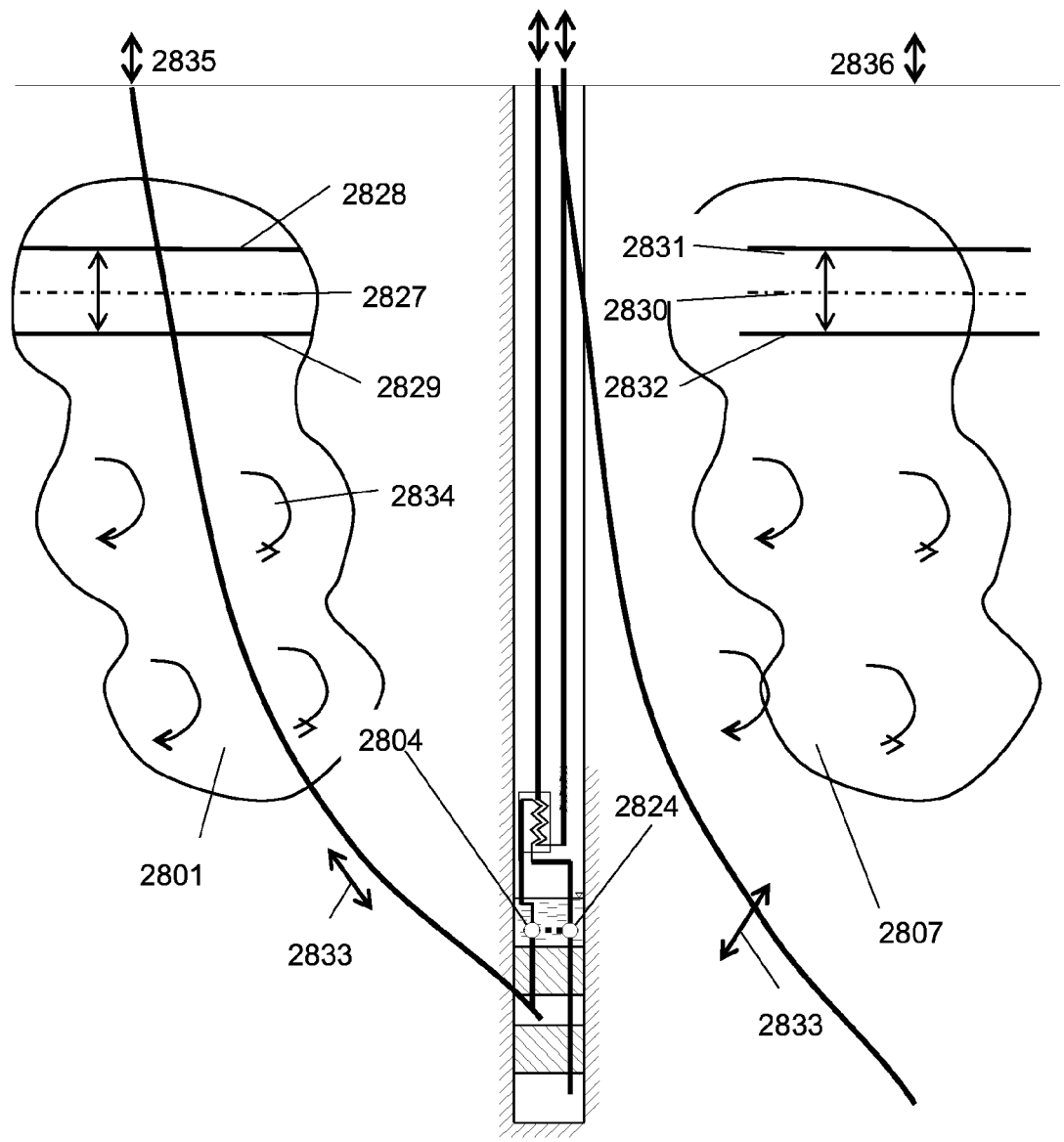
FIG. 28 is a schematic illustration of an engineered geothermal system having coupled fractures and a separate fluid connection well where the fluid moves in a pendulum-like swinging motion, formed according to embodiments of the disclosed methods.

FIG. 28 shows a system in which the fluid between fracture systems 2801 and 2807 is moved in a pendulum-like swing motion. Modulation of the fluid levels from center levels 2827 and 2830 in fractures 2801 and 2807, respectively, is induced either by operating pumps 2804 and 2824 alternatively or by changing pressure or the fluid volume periodically through fracture connections 2835 and 2836 to the surface (FIG. 28). When the coolant fluid reaches its highest level 2828 in fracture 2801, the coolant fluid in fracture 2807 reaches its lowest level 2832. Similarly, level 2829 in fracture 2801 corresponds to level 2831 in fracture 2807 (FIG. 28).

Such modulation requires low pumping energy since the kinetic energy is fully recovered during the pendulum motion in the tandem system in the example. Alternating, pendulum-type fluid flow induces vertical velocities over the fracture width and horizontal cross section at both sides. Flow in such case is driven by gravitational forces keeping the free fluid surfaces close to horizontal. In comparison, if the fluid in the fracture is continuously moved in one direction, the connection between the parallel flow channels within the fracture are provided by fluid friction and parallel pressure loops that are also governed by frictional flow resistance, giving weaker driving force. One-directional fluid movement is subject of short-circuiting by preferential pathways, whereas alternating fluid movement with two-phase flow which includes a fluid-gas free surface at which gravitational driving force is accessed, provides a strong cross-velocity field and delivers fluid to peripheral areas. Alternating, pendulum-type fluid flow induces vertical velocities more evenly than one directional circulation, promoting heat exchange known in the heat transfer literature as scotch pump enhancement. The fluid flow between fractures 2801 and 2807 goes through heat exchanger 2811 for thermal energy extraction (FIG. 28).

Figure 29:
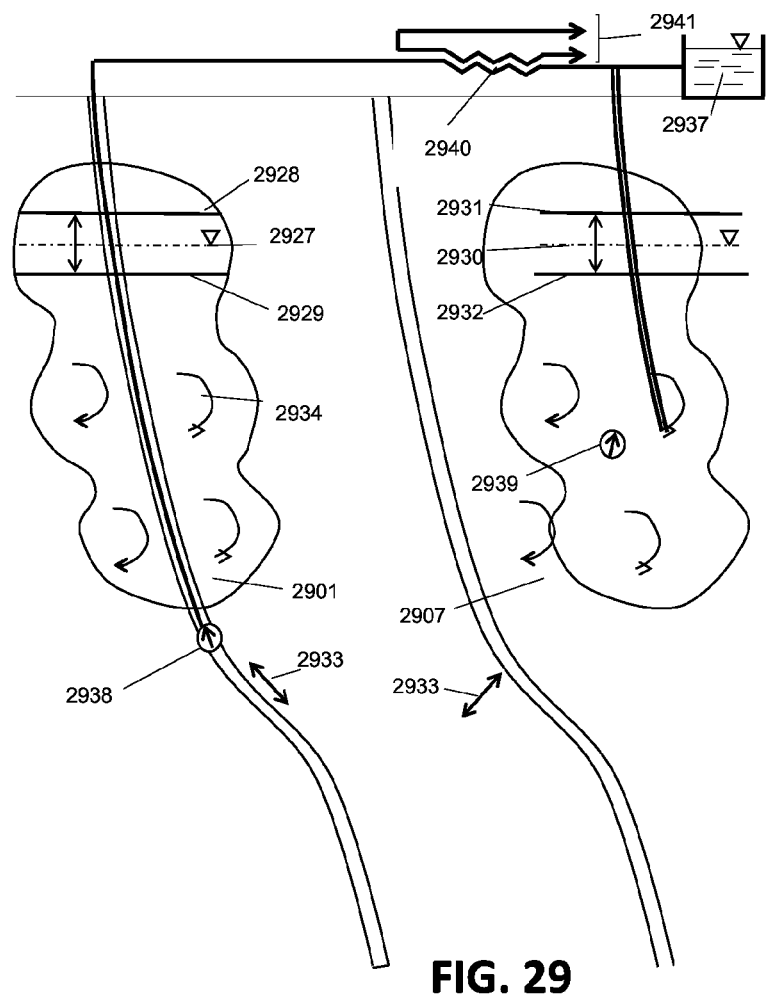
FIG. 29 is a schematic illustration of an engineered geothermal system having a combination of a periodic, pendulum-type flow field superimposed with a slow, one-directional cross-flow type coolant system for energy recovery, formed according to embodiments of the disclosed methods.
Figure 29:
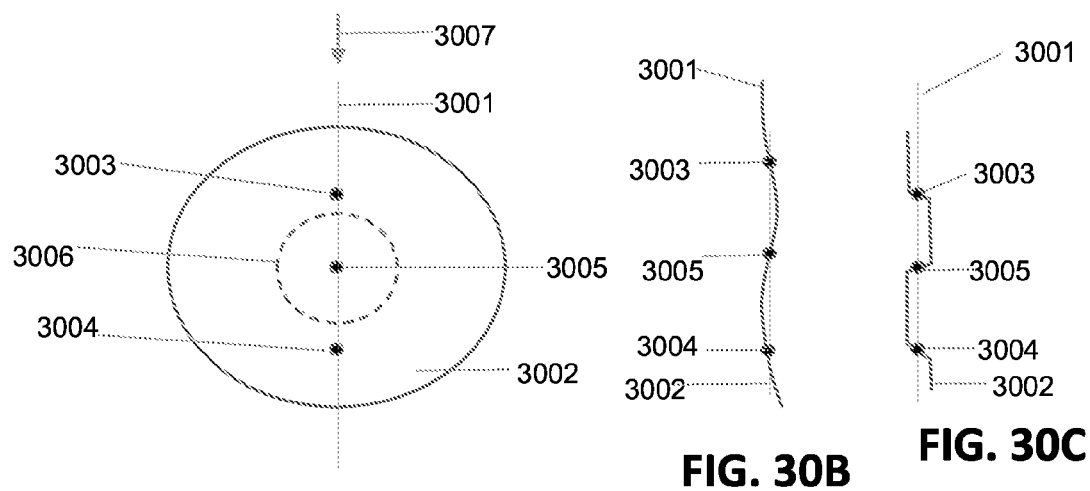

FIG. 29 shows a combination of the periodic, pendulum-type flow field superimposed to a slow, one-directional cross-flow type coolant system for energy recovery. This combined solution provides the simplicity of heat extraction on the surface without the need for a downhole heat exchanger and the flow field agitation within the fractures of the GHEs by the alternating velocity component. In order to maintain two-phase conditions with free fluid surfaces, submersible pumps 2938 and 2939 are employed at sufficient depths as optimally chosen for best enhancement performance. In the example shown in FIG. 29, pump 2938 maintains the slow cross-flow component, whereas pump 2939 modulates the flow by superimposing a pendulum type component with its connection to a modulator fluid reservoir, part of the fluid pendulum system as a dynamically connected, low-frequency, harmonic fluid resonator.

Example 13

Additional exemplary embodiments of a geothermal energy system are shown in FIGS. 30A, 30B and 30C. The embodiments shown in FIG. 30 have the following components: 3001 is a well; 3002 is a predominant planar artificial fracture or an artificial fracture close to a planar geometry; 3003 is a first selected point as injection point; 3004 is a second selected point as withdrawal point; 3005 is a third selected point as the center of a grouted island and coolant fluid blockage; 3006 is a grouted island and coolant fluid blockage; and 3007 is a coolant fluid well.

In this embodiment, well intersections with a predominantly planar artificial fracture (indicated in FIG. 30A) are shown. Two fracture shapes and two well trajectory shapes are shown in FIGS. 30B and 30C, with FIG. 30B showing a strictly planar fracture intersected by a curved well. The FIG. 30C shows a predominantly planar, rugged fracture intersected by a straight well.

FIG. 30 indicates that a tryout or test artificial planar fracture may be created from a main well, the planar geometry of the fracture may be surveyed during hydrofracturing by microseismic cloud measurements, and a side-branch well may be drilled from the main well directionally into the fracture so it intersects the fracture through multiple points. The flow connections may then be tested between the planar fracture and the side-branch well over the intersection points to select three main, best points or well sub-sections for efficient fluid flow connection, and the fracture may be opened with an injected, grouted support island in the middle point of the planar fracture as the third main point to stabilize an open, planar artificial fracture with separated injection and extraction points as the first and second main points for coolant fluid flow circulation.

VII. Overview of Several Embodiments

Disclosed herein are methods for creating an EGS in a well section comprising a host rock, an injection point, and an extraction point, wherein the methods comprise drilling a wellbore section in a direction normal to a minimum principal stress in the host rock, hydrofracturing the host rock by pumping fluid into the well section to form a planar artificial fracture comprising a void space in the planar artificial fracture, assessing a direction of the first planar artificial fracture, confirming that a trajectory of the wellbore section is aligned with the planar artificial fracture and its osculating plane by evaluating a directional difference between the osculating plane and the planar artificial fracture at a point where it intersects the wellbore, and using the directional difference to correct drilling direction for a subsequent wellbore section.

In some embodiments, the methods can further comprise constructing an additional wellbore section and an additional planar artificial fracture comprising a void space, such that the drilling direction of the additional wellbore section is aligned with an anticipated plane of the additional planar artificial fracture to be aligned with an osculating plane of the additional wellbore section over the additional planar fraction section, and confirming that the additional planar artificial fracture intersects the wellbore to create a series of wellbore sections and connected planar artificial fractures which intersect the wellbore sections at consecutive points and are osculating planes of the wellbore sections at the consecutive points.

Any or all of the above embodiments of methods for creating an EGS that result in creating a series of wellbore sections and connected planar artificial fractures which intersect the wellbore sections, can include embodiments wherein the connected planar artificial fractures comprise overlapping fracture volumes that are made continuous by at least one of a planar intersection or a secondary fracture.

In any or all of the above embodiments, assessing the direction of the planar artificial fracture and/or the additional planar artificial fracture is done using known techniques, including but not limited to stress field analysis, microseismic fracture assessment, analysis of deformation of the well diameter, hydraulic fluid injection and pressure analysis, or any combination of these techniques.

In any or all of the above embodiments, confirming that the wellbore section is aligned with the osculating plane can be performed by determining the trajectory of the wellbore, identifying at least two points on a plane of the planar artificial fracture that lie as common intersecting points on a wall of the wellbore section, and determining that at least part of the trajectory of the wellbore section between the intersecting points lies on one side of the planar artificial fracture.

Additionally, any or all of the above embodiments of methods for creating an EGS having a wellbore section that is aligned with one or multiple planar artificial fractures and its osculating plane, may also include inserting a pipe into the planar artificial fracture or the additional planar artificial fracture, applying hydraulic pressure to the pipe to increase the void space of the planar artificial fracture or the additional planar artificial fracture, pumping a hardening grout slurry that has pseudo-plastic rheological properties into the void space via the pipe, and forming a grouted support island in part of the planar artificial fracture or the additional planar artificial fracture.

In any or all of the above embodiments, the methods can further comprise directing the hardening grout in the void space of the planar artificial fracture or the additional planar artificial fracture to a location that facilitates efficient directional flow of a cooling fluid in the well.

In any or all of the above embodiments, the methods can further comprise delivering a reactive binder, activator, proppant, granulated support material or a combination of these materials, into the void space of the planar artificial fracture or the additional planar artificial fracture. In any or all of the above embodiments, the grout may be made with an ultra-high-strength geopolymer or cement concrete.

In any or all of the above embodiments, the methods may further comprise delivering a reactive binder, activator, proppant, or granulated support material, or any combination of these materials, into the void space of the planar artificial fracture or the additional planar artificial fracture. In any or all of the above embodiments, the methods may further incorporate a liner pipe having holes through which the hardening grout is delivered.

Further presented are methods for creating an EGS having a wellbore section that is aligned with one or multiple planar artificial fractures and its osculating plane, which also include inserting a pipe into the void space of the planar artificial fracture or the void space of the additional planar artificial fracture, pumping a cooling fluid into the void space of the planar artificial fracture or the void space of the additional planar artificial fracture via the pipe and opening a fracture aperture with fluid pressure, maintaining internal circulation of the cooling fluid between the pipe, the void space, and the wellbore section for an amount of time sufficient for the cooling fluid to reduce the host rock temperature, and forming secondary fractures in a wall of the planar artificial fracture or the additional planar artificial fracture.

Presented are methods for creating an EGS having a wellbore section that is aligned with one or multiple planar artificial fractures and its osculating plane, which also include inserting a pipe into the first planar artificial fracture comprising a void space, applying hydraulic pressure to the pipe to increase the void space of the first planar artificial fracture, blocking a cross section of the wellbore section, pumping a cooling fluid into the void space of the first planar fracture downwell (e.g., below the central part of a fracture at the furthest connection point with the fracture) of the blocked wellbore section, via the pipe, measuring flow and pressure parameters of the cooling fluid, withdrawing the cooling fluid through the void space of the first planar fracture, and assessing the parameters to determine the quality of the flow field in the artificial planar fracture. Any of the methods disclosed herein also include embodiments in which the cooling fluid comprises water, carbon dioxide, or compressed air, or any combination of these.

Additionally presented are methods that involve producing a well section comprising a host rock, an injection point, and an extraction point, drilling a wellbore section in a direction normal to a minimum principal stress in the host rock, hydrofracturing the host rock by pumping fluid into the well section to form a planar artificial fracture comprising a void space in the planar artificial fracture, assessing a direction of the first planar artificial fracture, confirming that a trajectory of the wellbore section is aligned with the planar artificial fracture and its osculating plane by evaluating a directional difference between the osculating plane and the planar artificial fracture at a point where it intersects the wellbore, inserting a pipe into the first planar artificial fracture comprising a void space, applying hydraulic pressure to the pipe to increase the void space of the first planar artificial fracture, pumping a hardening grout slurry into the void space via the pipe, wherein the slurry has pseudo-plastic rheological properties, forming a grouted support island in part of the planar artificial fracture or the additional planar artificial fracture, pumping a cleaning slurry into the grouted support island, maintaining the fracture opening by hydraulic pressure until the grouted support island is hardened, removing the cleaning slurry from the wellbore, blocking a cross section of the wellbore section, pumping a cooling fluid into the void space of the first planar fracture downwell of the blocked wellbore section, via the pipe, maintaining internal circulation of the cooling fluid between the pipe, the void space, and the wellbore section for an amount of time sufficient for the cooling fluid to reduce the host rock temperature, and forming a secondary fracture in the wall of the host rock.

Any or all of the above embodiments can further comprise pumping a slurry comprising a proppant and a carrying fluid into the well. In any or all of the above embodiments, the proppant comprises sand, gravel, ceramic spheres, metal spheres, or any combination of these materials. In any or all of the above embodiments, the carrying fluid comprises water, flying ash, clay, a polymeric material, or any combination of these materials.

Engineered geothermal systems also are presented that include a well comprising a series of connected planar artificial fractures that intersect a wellbore of the well sequentially along its length, wherein a plane of each of the planar artificial fractures is aligned with an osculating fracture plane of the wellbore trajectory, and a heat transfer fluid. In any or all of the above embodiments, a portion of the heat transfer fluid is located in the connected planar artificial fractures. In any or all of the above embodiments, the systems can further comprise a well that has a grouted support island and/or a well that includes a flow blockage in the wellbore section comprising the grouted support island. In any or all of the above embodiments, the series of connected planar artificial fractures can additionally include a secondary fracture created by thermal enhancement of a planar artificial fracture. In any or all of the above embodiments, the systems may include a well that contains both an injection point and an extraction point.

In any or all of the above embodiments, the systems may also include an artificial fracture comprising a void space, a first point in the artificial fracture configured to be a fluid injection point, a second point in the artificial fracture configured to host a grouted support island, a third point in the artificial fracture configured to be a fluid withdrawal point, a well that intersects the artificial fracture at the first point, the second point, and the third point; and a grouted support island within the artificial fracture. In any or all of the above embodiments, the first point and the third point are located at a distance from each other that is longer than a distance between the second point and either the first point or the third point. In any or all of the above embodiments, the second point is positioned between the first point and the third point and each point has flow connectivity between the void space of the artificial fracture and the well.

Further presented are devices that may be used in any of the disclosed methods or any of the disclosed engineered geothermal systems that have a body with a variable diameter, an upper inflatable packer, a central inflatable packer, a lower inflatable packer, an injection pipe orifice, an extraction pipe orifice, a plurality of flow velocity sensors, and a pressure sensor. In any or all of the above embodiments, the devices can further comprise an optical sensor. Any or all of the above device embodiments can be used for constructing a first planar artificial fracture in a well comprising a host rock, an injection point and an extraction point, wherein a plane of the first planar artificial fracture is aligned with an osculating fracture plane of the wellbore trajectory. Any or all of the above embodiments may also be used for creating a secondary planar artificial fracture normal to the plane of a primary fracture along a well. Any or all of the above device embodiments also be used to create a series of overlapped osculating planar artificial fractures along the trajectory of a well which follows the directional changes of the in situ stress field in a host rock, wherein the overlapped osculating planar artificial fracture volumes are made continuous by planar intersections, secondary fractures, or a combination of a planar intersections and a secondary fracture.

Any or all of the above device embodiments can also be used for any of the disclosed methods or systems to produce a well section comprising a host rock, an injection point, and an extraction point, drilling a wellbore section in a direction normal to a minimum principal stress in the host rock, hydrofracturing the host rock by pumping fluid into the well section to form a planar artificial fracture comprising a void space in the planar artificial fracture, assessing a direction of the first planar artificial fracture, confirming that a trajectory of the wellbore section is aligned with the planar artificial fracture and its osculating plane, or confirming that a trajectory of the wellbore section intersects at least two points of the first planar artificial fracture. In any or all of the above embodiments, the central inflatable packer may be split into two sections and the device can optionally contain an additional orifice.

Additionally presented are uses of any of the disclosed devices for inserting a pipe into a first planar artificial fracture comprising a void space in a well comprising a host rock, an injection point and an extraction point, applying hydraulic pressure to the pipe to increase the void space of the first planar artificial fracture, pumping a hardening grout slurry into the void space via the pipe, wherein the slurry has pseudo-plastic rheological properties, and forming a grouted support island in part of the planar artificial fracture. In any or all of the above embodiments, the hardening grout comprises an ultra-high-strength geopolymer or cement concrete.

Using the methods and systems disclosed herein, a process to construct a dominantly vertical fracture which can be filled efficiently with proppants by means of aligning the wellbore with the plane of the artificial fracture created by hydrofracturing from the wellbore is presented, by directionally drilling the wellbore normal to the minimum principal stress in the host rock to a desired depth; hydrofracturing by pumping high-pressure fluid into the well; assessing the direction of the planar fracture and confirming that the direction of the well is indeed aligned with the fracture plane; whereas, continue drilling into corrected, intended direction that follows tangent of the fracture plane and close to the normal to the minimum principal stress direction in the rock for the next section for hydrofracturing; and continue the process to the deepest desired depth, creating a near-continuous hydrofracture that intersects the wellbore all the way along its length.

Additionally disclosed is a process to deliver proppants to the fracture by means of inserting a trammy pipe all the way to the bottom; applying hydraulic pressure to open the fracture several times wider than the largest diameter of the proppant particles; pumping a mixture of liquid and solid proppants as slurry into the well, allowing the proppant flow along the angle of repose slope angle; whereas extract water in upward direction and lift proppants against its weight with the upward recirculation of water in the fracture for delivery of proppants to great horizontal distances from the injection point; and optionally position the inlet of a water circulation tube at a higher elevation point from the slurry injection point.

Further disclosed is an agitated, tandem cooling system using two GHE fracture systems constructed far apart from and outside of thermal interference but close enough to be joined with a common flow connection; each GHE cooled using the two-phase, alternating cooling method disclosed in U.S. Pat. No. 8,430,166, the two sides connected through a downhole heat exchanger for energy extraction at the surface, whereas, the two sides are connected into a fluid pendulum in which the coolant mass periodically swings from one side to the other; the coolant mass is flown through a coupled pair of pump and recovery turbine; the kinetic energy of the motion is recovered and the pressure in the GHE in either side is controlled by the motion; the two-phase heat exchange between the fluid and the rock on either GRE is completed; and the exchanged thermal energy is extracted from the fluid during its pendulum motion by a downhole heat exchanger connected to the geothermal power plant.

Also disclosed are additional tandem cooling systems using two GHE fracture systems constructed far apart from thermal interference but close enough to be joined with a common flow connection are also presented; each GHE cooled using the single-phase, agitated cooling method known as scotch pump-type heat transport enhancement, the two sides connected through a cross flow pipeline for energy extraction at the surface, whereas, the flow between the two sides are controlled having first a one-directional cross-flow component driven by a one-directional pump for energy extraction at the surface via a heat exchanger, and second, a superimposed, bi-directional, alternating flow component driven and controlled by a reversible pump that swings a fluid pendulum in which a large portion of the coolant mass in the dual GHE periodically swings from one side to the other and the associated kinetic energy of the motion is translated into periodic coolant level changes in both GHE systems, creating vertical fluid motion over the entire fracture volumes, mixing with the cross-flow component, and enhancing thermal energy exchange in hard-to-reach fracture surface areas.

In yet additional embodiments, agitated, tandem cooling systems using two GHE fracture systems as described above are presented, whereas, the cross flow between them provides for thermal energy extraction on the surface and it is modulated by superimposing a pendulum type component with flow connection to a modulator fluid reservoir, part of the fluid pendulum system forming a dynamically connected, low-frequency, harmonic fluid resonator in which the loss of energy due to friction is replenished by a controlled, submersible pump in the system.

In view of the many possible embodiments to which the principles of the present disclosure may be applied, it should be recognized that the illustrated embodiments are only preferred examples of the disclosure and should not be taken as limiting the scope of the claimed invention. Rather, the scope of is defined by the following claims. I therefore claim as my invention all that comes within the scope and spirit of these claims.

I claim:

1. A method, comprising:
   producing a well section comprising a host rock, an injection point, and an extraction point;
   drilling a wellbore section in a direction normal to a minimum principal stress in the host rock;
   hydrofracturing the host rock by pumping fluid into the well section to form a planar artificial fracture comprising a void space in the planar artificial fracture;
   assessing a direction of the planar artificial fracture;
   confirming that a trajectory of the wellbore section is aligned with the planar artificial fracture and its osculating plane by evaluating a directional difference between the osculating plane and the planar artificial fracture at a point where it intersects the wellbore section; and using the directional difference to correct drilling direction for a subsequent wellbore section.

2. The method of claim 1, further comprising pumping (i) a slurry comprising a proppant and (ii) a carrying fluid into the well, wherein the proppant comprises sand, gravel, ceramic spheres, metal spheres, or a combination thereof and the carrying fluid comprises water, flying ash, clay, a polymeric material, or a combination thereof.

3. The method of claim 1, further comprising:

constructing an additional wellbore section and an additional planar artificial fracture comprising a void space, wherein a drilling direction of the additional wellbore section is aligned with an anticipated plane of the additional planar artificial fracture to be aligned with an osculating plane of the additional wellbore section over the additional planar fraction section; and confirming that the additional planar artificial fracture intersects the additional wellbore section to create a series of wellbore sections and connected planar artificial fractures which intersect the wellbore sections at consecutive points and are osculating planes of the wellbore sections at the consecutive points.

4. The method of claim 3, wherein the connected planar artificial fractures comprise overlapping fracture volumes that are made continuous by at least one of a planar intersection or a secondary fracture.

5. The method of claim 1, wherein assessing the direction of the planar artificial fracture and/or the additional planar artificial fracture comprises using stress field analysis; microseismic fracture assessment; analysis of deformation of well diameter, hydraulic fluid injection and pressure analysis; or a combination thereof.

6. The method of claim 1, wherein confirming that a trajectory of the wellbore section is aligned with the osculating plane comprises:

determining the trajectory of the wellbore section;

identifying at least two points on a plane of the planar artificial fracture that lie as common intersecting points on a wall of the wellbore section; and determining that at least part of the trajectory of the wellbore section between the intersecting points lies on one side of the planar artificial fracture.

7. The method of claim 1, further comprising:

inserting a pipe into the planar artificial fracture;

applying hydraulic pressure to the pipe to increase the void space of the planar artificial fracture;

pumping a hardening grout slurry into the void space via the pipe, wherein the hardening grout slurry has pseudo-plastic rheological properties; and forming a grouted support island in part of the planar artificial fracture.

8. The method of claim 7, further comprising directing the hardening grout slurry in the void space of the planar artificial fracture to a location that facilitates efficient directional flow of a cooling fluid in the well and/or delivering a reactive binder, activator, proppant, granulated support material or a combination thereof, into the void space of the planar artificial fracture.

9. The method of claim 8, wherein the hardening grout slurry comprises an ultra-high-strength geopolymer or cement concrete and wherein the well section comprises a liner pipe comprising holes through which the hardening grout slurry is delivered.

10. The method of claim 1, further comprising:

inserting a pipe into the void space of the planar artificial fracture;

pumping a cooling fluid into the void space of the planar artificial fracture via the pipe and opening a fracture aperture with fluid pressure;

maintaining internal circulation of the cooling fluid between the pipe, the void space, and the wellbore section for an amount of time sufficient for the cooling fluid to reduce the host rock temperature; and forming secondary fractures in a wall of the planar artificial fracture.

11. The method of claim 10, wherein the cooling fluid comprises water, carbon dioxide, or compressed air.

12. The method of claim 1, further comprising:

inserting a pipe into the first planar artificial fracture comprising a void space;

applying hydraulic pressure to the pipe to increase the void space of the planar artificial fracture;

blocking a cross section of the wellbore section;

pumping a cooling fluid into the void space of the planar artificial fracture down well of the blocked wellbore section, via the pipe;

measuring flow and pressure parameters of the cooling fluid;

withdrawing the cooling fluid through the void space of the planar artificial fracture; and assessing the parameters to determine the quality of the flow field in the planar artificial fracture.

13. An engineered geothermal system, comprising:

a well comprising a series of connected planar artificial fractures that intersect a wellbore section of the well sequentially along its length, wherein a plane of each of the planar artificial fractures is aligned with an osculating fracture plane of a trajectory of the wellbore section; and a heat transfer fluid.

14. The system of claim 13, wherein a portion of the heat transfer fluid is located in the series of connected planar artificial fractures.

15. The system of claim 13, wherein the well further comprises an injection point and an extraction point, a grouted support island, a flow blockage in the wellbore section comprising a grouted support island, or any combination thereof.

16. The system of claim 13, wherein the series of connected planar artificial fractures further comprise a secondary fracture created by thermal enhancement of a planar artificial fracture.

* * * * *